United States Patent
Sheridan et al.

(10) Patent No.: US 9,792,443 B1
(45) Date of Patent: Oct. 17, 2017

(54) POSITION ANALYSIS OF SOURCE CODE VULNERABILITIES

(71) Applicant: WhiteHat Security, Inc., Santa Clara, CA (US)

(72) Inventors: Eric Sheridan, Greensboro, NC (US); Harry Papaxenopoulos, Riverhead, NC (US); John Thomas Melton, Harrisburg, NC (US)

(73) Assignee: WHITEHAT SECURITY, INC., Santa Clara, CA (US)

( * ) Notice: Subject to any disclaimer, the term of this patent is extended or adjusted under 35 U.S.C. 154(b) by 0 days.

(21) Appl. No.: 14/656,503

(22) Filed: Mar. 12, 2015

(51) Int. Cl.
*G06F 21/00* (2013.01)
*G06F 21/57* (2013.01)

(52) U.S. Cl.
CPC ...... *G06F 21/577* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 5,768,480 A | 6/1998 | Crawford, Jr. | |
| 6,029,002 A * | 2/2000 | Afifi | G06F 8/433 714/E11.209 |
| 6,553,362 B2 * | 4/2003 | Saxe | G06F 9/44589 706/47 |
| 6,594,783 B1 * | 7/2003 | Dollin | G06F 8/427 714/38.14 |
| 6,807,548 B1 * | 10/2004 | Kemper | G06F 8/72 |
| 8,745,606 B2 * | 6/2014 | Guo | G06F 8/433 717/156 |
| 8,769,696 B2 * | 7/2014 | Pistoia | G06F 21/00 380/29 |
| 8,776,239 B2 * | 7/2014 | De Keukelaere | G06F 11/00 713/188 |
| 8,819,637 B2 * | 8/2014 | Abadi | G06F 21/577 707/759 |
| 8,844,046 B2 * | 9/2014 | Guarnieri | G06F 21/577 726/25 |
| 2005/0166193 A1 | 7/2005 | Smith | |
| 2007/0083933 A1 * | 4/2007 | Venkatapathy | G06F 21/577 726/25 |
| 2008/0060077 A1 * | 3/2008 | Cowan | G06F 9/4426 726/25 |

(Continued)

OTHER PUBLICATIONS

International Search Report and Written Opinion mailed Jul. 18, 2014, in International Patent Application No. PCT/US2014/020783, filed May 3, 2014, 16 pages.

*Primary Examiner* — Maung Lwin
(74) *Attorney, Agent, or Firm* — Polsinelli PC

(57) ABSTRACT

Techniques for performing position analysis on a representation of an application source code are disclosed herein. An application source code is scanned to produce a representation of the application source code, start locations within the representation are determined, corresponding stop locations within the representation are determined, and a set of data impact locations within the representation are determined. The set of data impact locations are then used in a dataflow analysis to determine a position of high control of the data within the representation.

20 Claims, 24 Drawing Sheets

(56) References Cited

U.S. PATENT DOCUMENTS

| | | |
|---|---|---|
| 2009/0144698 A1* | 6/2009 | Fanning .................... G06F 8/75 |
| | | 717/120 |
| 2010/0083240 A1* | 4/2010 | Siman ..................... G06F 8/433 |
| | | 717/144 |
| 2010/0299659 A1 | 11/2010 | Kirshnaswamy |
| 2011/0055815 A1* | 3/2011 | Squillace ............ G06F 11/3612 |
| | | 717/125 |
| 2011/0307956 A1* | 12/2011 | Yermakov ........... H04L 63/0227 |
| | | 726/24 |
| 2011/0314458 A1 | 12/2011 | Zhu |
| 2012/0102474 A1 | 4/2012 | Artzi |
| 2012/0192161 A1 | 7/2012 | Pistoia |
| 2012/0311533 A1 | 12/2012 | Fanning |
| 2014/0282424 A1 | 9/2014 | Sheridan |
| 2015/0020056 A1* | 1/2015 | Wu .......................... G06F 8/41 |
| | | 717/144 |
| 2015/0058993 A1* | 2/2015 | Choi ................... H04L 63/1433 |
| | | 726/25 |

\* cited by examiner

| Left Side | | | | | | |
|---|---|---|---|---|---|---|
| | | Right Side | | | | |
| | FULL | LEFT | CENTER | RIGHT | LEFTRIGHT | NONE |
| FULL | FULL | LEFT | LEFT | LEFT | LEFTRIGHT | LEFT |
| LEFT | LEFTRIGHT | LEFT | LEFT | LEFTRIGHT | LEFTRIGHT | LEFT |
| CENTER | RIGHT | RIGHT | CENTER | RIGHT | RIGHT | CENTER |
| RIGHT | RIGHT | RIGHT | CENTER | RIGHT | LEFTRIGHT | CENTER |
| LEFTRIGHT | LEFTRIGHT | LEFT | LEFT | RIGHT | LEFTRIGHT | LEFT |
| NONE | RIGHT | CENTER | CENTER | RIGHT | RIGHT | NONE |

FIG. 9

```
001  <security_fix_rules xmlns="security_fix_rules.xsd">
002    <security_fix_rule id="CA7A-78C2-0F2D-863E-28B2-9B38-07CA-69CB" intrusiveness="high">
003      <!-- map fix rule to vulnerability class -->
004      <criteria mode="and">
005        <vulnerability_rule_criteria mode="and">
006          <vulnerability_rule_criterion>
007            <class_name>Cryptography.Persist.Ccn.Unencrypted</class_name>
008          </vulnerability_rule_criterion>
009        </vulnerability_rule_criteria>
010      </criteria>
011      <!-- considerations for altering CCN encryption -->
012      <considerations>
013        <consideration kind="data_persistence" />
014        <consideration kind="data_consumption" />
015        <consideration kind="data_classification_policy" />
016      </considerations>
017      <!-- locate area requiring fix -->
018      <remediation>
019        <title>Persist CCN in Encrypted Form</title>
020        <description>
021          Storing a credit card number in a form that is not encrypted can lead
022          to serious legal and policy impacts. It also increases the likelihood
023          of disclosure and the impact if a breach should occur.
024
025          This solution fixes this issue by performing AES-256 encryption on the
026          CCN before storage.
027
028          Note there are several ramifications of this change, including modified
029          data storage requirements as well as performing decryption anywhere the
030          data is read back from storage.
031
032          This solution also allows you to select the mechanism for key retrieval.
033        </description>
```

FIG. 13A

```
034   <solutions apply="select">
035   <!-- case 1: inject encryption for java using key from file -->
036   <solution id="91B1-9136-02FA-4D30-8183-F183-F5AE-27AD">
037       <search mode="position">
038       <!-- limit solution to java programming language -->
039       <language_criteria mode="OR">
040           <language_criterion name="java" />
041       </language_criteria>
042       </search>
043       <replace mode="exact">
044       <with>
045           <!-- note: DATA_FLOW_REPLACEMENT_KEY is a built-in variable
046                that contains the original text identified by the
047                "search" criteria -->
048           <![CDATA[cryptography.CryptographyHelper.encryptWithKeyFromFile
049               ($|DATA_FLOW_REPLACEMENT_KEY|,
050               new java.io.File("${key_file_name}"),
051               new java.io.File("${iv_file_name}"))
052           ]]>
053       </with>
054       <where>
055           <!-- user must indicate file where encryption key is stored -->
056           <property name="key_file_name" kind="text" />
057           <!-- user must indicate file where encryption iv is stored -->
058           <property name="iv_file_name" kind="text" />
059       </where>
060       </replace>
061       <dependencies>
062       <dependency kind="file">
063           <location>com/cryptography/CryptographyHelper.java</location>
064       </dependency>
065       </dependencies>
066   </solution>
```

FIG. 13B

```
067        <!-- case 2: injection encryption for java using key from env variable -->
068        <solution id="3119-FE9F-5D00-AC9A-E21A-C13A-3AB3-0AE9">
069            <search mode="position">
070                <!-- limit solution to java programming language -->
071                <language_criteria mode="OR">
072                    <language_criterion name="Java" />
073                </language_criteria>
074            </search>
075            <replace mode="exact">
076                <with>
077                    <!-- note: DATA_FLOW_REPLACEMENT_KEY is a built-in variable that
078                         contains the original text identified by the "search" criteria -->
079                    <![CDATA[cryptography.CryptographyHelper.encryptWithKeyFromEnvVariable
080                    (${DATA_FLOW_REPLACEMENT_KEY},
081                    "${key_environment_variable}",
082                    "${iv_environment_variable}")
083                    ]]>
084                </with>
085                <where>
086                    <!-- user must indicate environment variable where key is stored -->
087                    <property name="key_environment_variable" kind="text" />
088                    <!-- user must indicate environment variable where iv is stored -->
089                    <property name="iv_environment_variable" kind="text" />
090                </where>
091            </replace>
092            <dependencies>
093                <dependency kind="file">
094                    <location>com/cryptography/CryptographyHelper.java</location>
095                </dependency>
096            </dependencies>
097        </solution>
098    </solutions>
099    </remediation>
100 </security_fix_rule>
101 </security_fix_rules>
```

FIG. 13C

```
001  <security_patch_rules phase="review" xmlns="security_patch_rules.xsd">
002    <security_patch_rule id="CA7A-78C2-0F2D-863E-28B2-9B38-07CA-69CB" intrusiveness="high">
003      <criteria>
004        <vulnerability>B3DC-2E69-04AB-B4AE-D5B8-DD6D-574D-98BB</vulnerability>
005        <file_hashes>
006          <file_hash>
007            <relative_path>
008              src/functions/CcnUnencryptedFunction.java
009            </relative_path>
010            <hash>
011              98913A6FDF6EF3FDCDFF366858F9EFDD6E680A25E4DE9F5D56CC69BA708A
012              3874314BB85B4713C7BF39D19B4B13E1B27F68A98ED6A2746EE2B8228A0F57
013              F08A08
014            </hash>
015          </file_hash>
016        </file_hashes>
017      </criteria>
018      <considerations>
019        <consideration kind="data_persistence">
020          <description></description>
021        </consideration>
022        <consideration kind="data_consumption">
023          <description></description>
024        </consideration>
025        <consideration kind="data_classification_policy">
026          <description></description>
027        </consideration>
028      </considerations>
```

FIG. 14A

```xml
<remediation>
    <title>Persist CCN in Encrypted Form</title>
    <description>
        Storing a credit card number in a form that is not encrypted can lead
        to serious legal and policy impacts. It also increases the likelihood
        of disclosure and the impact if a breach should occur.

This solution fixes this issue by performing AES-256 encryption on the
        CCN before storage.

Note there are several ramifications of this change, including modified
        data storage requirements as well as performing decryption anywhere the
        data is read back from storage.

This solution also allows you to select the mechanism for key retrieval.
    </description>
    <solution id="91B1-9136-02FA-4D30-8183-F183-F5AE-27AD">
        <replace mode="exact">
            <at>
                <relative_file_path>com/functions/CcnUnencryptedFunction.java
                </relative_file_path>
                <line_number>
                    <start>31</start>
                    <end>31</end>
                </line_number>
                <column_number>
                    <start>21</start>
                    <end>30</end>
                </column_number>
            </at>
```

FIG. 14B

```
060        <with>
061            com.cryptography.CryptographyHelper.encryptWithKeyFromFile
062            (${DATA_FLOW_REPLACEMENT_KEY},
063            new java.io.File("${key_file_name}"),
064            new java.io.File("${iv_file_name}"))
065        </with>
066        <where>
067            <property name="key_file_name" kind="text"></property>
068            <property name="iv_file_name" kind="text"></property>
069        </where>
070    </replace>
071    <dependencies>
072        <dependency kind="file">
073            <location>com/cryptography/CryptographyHelper.java
074            </location>
075        </dependency>
076    </dependencies>
077 </solution>
078 <solution id="3119-FE9F-5D00-AC9A-E21A-C13A-3AB3-0AE9">
079    <replace mode="exact">
080        <at>
081            <relative_file_path>src/functions/CcnUnencryptedFunction.java
082            </relative_file_path>
083            <line_number>
084                <start>31</start>
085                <end>31</end>
086            </line_number>
087            <column_number>
088                <start>21</start>
089                <end>30</end>
090            </column_number>
091        </at>
```

```
092       <with>
093          com.cryptography.CryptographyHelper.
094          encryptWithKeyFromEnvironmentVariable
095          (${DATA_FLOW_REPLACEMENT_KEY},
096          "${key_environment_variable}",
097          "${iv_environment_variable}")
098       </with>
099       <where>
100          <property name="key_environment_variable" kind="text">
101          </property>
102          <property name="iv_environment_variable" kind="text">
103          </property>
104       </where>
105     </replace>
106     <dependencies>
107       <dependency kind="file">
108         <location>com/cryptography/CryptographyHelper.java
109         </location>
110       </dependency>
111     </dependencies>
112   </solution>
113  </solutions>
114  </remediation>
115 </security_patch_rule>
116 </security_patch_rules>
```

FIG. 14D

```xml
001 <security_patch_rules phase="apply" xmlns="security_patch_rules.xsd">
002   <security_patch_rule id="CA7A-78C2-0F2D-863E-28B2-9B38-07CA-69CB" intrusiveness="high">
003     <criteria>
004       <vulnerability>B3DC-2E69-04AB-B4AE-D5B8-DD6D-574D-98B3</vulnerability>
005       <file_hashes>
006         <file_hash>
007           <relative_path>
008             src/functions/CcnUnencryptedFunction.java
009           </relative_path>
010           <hash>
011             98913A6FDF6EF3FDCDFF366859F9EFDD6E680A25E4D9F5D56CC69BA708A
012             3874314BB85B4713C7BF38D19B4B13E1B27F68A98ED6A2746EE2B8228A0F57
013             F08A08
014           </hash>
015         </file_hash>
016       </file_hashes>
017     </criteria>
018     <considerations>
019       <consideration kind="data_persistence">
020         <description></description>
021       </consideration>
022       <consideration kind="data_consumption">
023         <description></description>
024       </consideration>
025       <consideration kind="data_classification_policy">
026         <description></description>
027       </consideration>
028     </considerations>
```

FIG. 15A

```
029  <remediation>
030      <title>Persist CCN in Encrypted Form</title>
031      <description>
032          Storing a credit card number in a form that is not encrypted can lead
033          to serious legal and policy impacts. It also increases the likelihood
034          of disclosure and the impact if a breach should occur.
035
036          This solution fixes this issue by performing AES-256 encryption on the
037          CCN before storage.
038
039          Note there are several ramifications of this change, including modified
040          data storage requirements as well as performing decryption anywhere the
041          data is read back from storage.
042
043          This solution also allows you to select the mechanism for key retrieval.
044      </description>
045      <solutions apply="select">
046          <solution id="91B1-9136-02FA-4D30-8183-F183-F5AE-27AD">
047              <replace mode="exact">
048                  <at>
049                      <relative_file_path>com/functions/CcnUnencryptedFunction.java
050                      </relative_file_path>
051                      <line_number>
052                          <start>31</start>
053                          <end>31</end>
054                      </line_number>
055                      <column_number>
056                          <start>21</start>
057                          <end>30</end>
058                      </column_number>
059                  </at>
```

FIG. 15B

```
060          <with>
061            com.cryptography.CryptographyHelper.encryptWithKeyFromFile
                 (${DATA_FLOW_REPLACEMENT_KEY},
062              new java.io.File("${key_file_name}"),
063              new java.io.File("${iv_file_name}"))
064          </with>
065        <where>
066          <property name="key_file_name" kind="text">
067            /opt/secret/key.txt</property>
068          <property name="iv_file_name" kind="text">
069            /opt/secret/iv.txt</property>
070        </where>
071      </replace>
072      <dependencies>
073        <dependency kind="file">
074          <location>com/cryptography/CryptographyHelper.java
075          </location>
076        </dependency>
077      </dependencies>
078    </solution>
079  </remediation>
080 </security_patch_rule>
081 </security_patch_rules>
```

FIG. 15C

```
public class CcnUnencryptedFunction implements Function {

@Override
    public boolean isVulnerable(Object object) {
        boolean isVulnerable = true;

String ccn = "1234 5678 9012 3456";

String result = (String)execute(ccn);

if(result.length() != ccn.length() + 1) {
            isVulnerable = false;
        }

PreparedStatement preparedStatement = null;

try {
            preparedStatement.setString(1, result);
        } catch(SQLException e) {
            // process exception
        } return isVulnerable;
    }

@Override
    public Object execute(Object object) {
        String plainText = (String)object;

// string length alteration
        // return "a" + plainText;
        return "a" + com.cryptography.CryptographyHelper.encryptWithKeyFromFile
                (plainText,
                 new java.io.File("/opt/secret/key.txt"),
                 new java.io.File("/opt/secret/iv.txt")));
    }
}
```

1602 ← Remediation

FIG. 16

POSITION ANALYSIS OF SOURCE CODE VULNERABILITIES

CROSS-REFERENCE TO RELATED APPLICATIONS

This application incorporates by reference for all purposes the full disclosure of co-pending U.S. patent application Ser. No. 14/656,490, filed concurrently herewith, entitled "AUTO-REMEDIATION WORKFLOW FOR COMPUTER SECURITY TESTING".

BACKGROUND

Modern computer systems may comprise a variety of components, some of which are provided by third-parties and some of which are developed in-house. Components developed in-house may receive frequent updates to, for example, add new features or to fix defects. Such updates may introduce security vulnerabilities in the computer system, some of which may be difficult to locate. For example, a source code change to fix a defect in a software component may pass unit tests, regression tests, "black box" tests, and other such tests, but may still introduce security vulnerabilities due to interaction with other components in the system. Maintaining the security of such complex systems may be made more difficult when such components frequently change.

Software testing and, in particular, static code analysis may be used to identify some software vulnerabilities. In static code analysis, a software application is tested without actually executing the application. The software application is typically tested by processing and analyzing the source code of the application. The entire source code of the application, or only portions of the source code, may be analyzed. The source code may be analyzed for one or more of a variety of purposes, such as for identifying possible coding errors, determining properties of the software application, or determining vulnerabilities. However, such analysis may only identify errors and vulnerabilities without performing any steps to remediate such vulnerabilities. Additionally, such analysis may only locate one of a plurality of vulnerabilities, particularly when such vulnerabilities occur at or near a control flow, where a plurality of execution paths may be taken. Such analysis and remediation may become even more complex in source code that makes use of modern programming paradigms such as object-oriented programming, inversion of control, dependency injection, and aspect-oriented programming. Failure to remediate such source code security vulnerabilities may make computer systems less stable, less available, and/or less secure, leading to a degraded experience for users of those systems.

BRIEF SUMMARY

Systems, processes, and methods for determining the position of source code vulnerabilities is described herein. Source code may be scanned for security vulnerabilities using, for example, static analysis techniques. Such analysis may include methods for determining the position where such vulnerabilities may be most efficiently remediated. For example, using line number and column number information generated during the static analysis, the precise position of a vulnerability in a source code representation may be provided to a process or service configured to remediate such vulnerabilities. Similarly, a dataflow analysis may be used to determine a location within the dataflow of a source code representation where, for example, an attacker may have the most control over an input or some other data item. Determining the position of vulnerabilities in source code representations may allow such security vulnerabilities to be automatically identified and remediated by applying security patch rules to the correct and/or most ideal location in the source code representation. The patched source code with the security vulnerabilities removed may then be tested, verified, and/or merged back into the source code.

The following detailed description together with the accompanying drawings will provide a better understanding of the nature and advantages of the present invention.

BRIEF DESCRIPTION OF THE FIGURES

Various embodiments in accordance with the present disclosure will be described with reference to the drawings, in which:

FIG. 9 illustrates an example position analysis matrix used for determining the position of source code vulnerabilities in accordance with an embodiment;

FIGS. 13A, 13B, and 13C illustrate an example security fix rule in accordance with an embodiment;

FIGS. 14A, 14B, 14C, and 14D illustrate an example security patch rule in review phase in accordance with an embodiment;

FIGS. 15A, 15B, and 15C illustrate an example security patch rule in apply phase in accordance with an embodiment;

FIG. 16 illustrates and example of the results of applying a security patch rule to source code in accordance with an embodiment.

DETAILED DESCRIPTION

Figure 1:
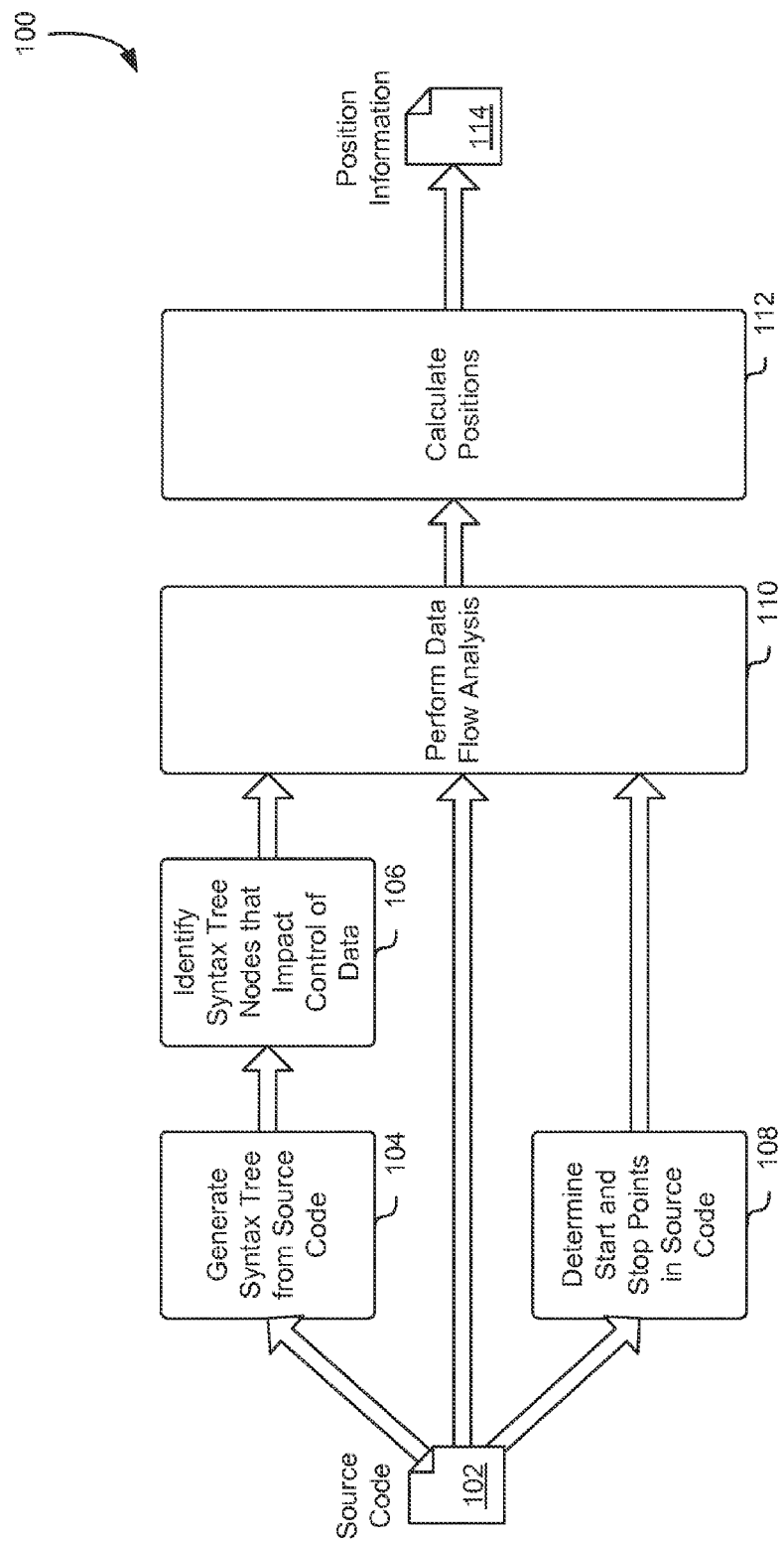
FIG. 1 illustrates an example environment where position analysis is used to determine the position of source code vulnerabilities in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems, and processes to perform position analysis of source code vulnerabilities. The first step in remediating computer system security vulnerabilities in source code is that a representation of source code may be scanned for security vulnerabilities using static analysis and/or dynamic analysis techniques. In some embodiments, the scanning of the source code and/or the determination of vulnerabilities may be performed by an external process or preprocess such as, for example, by a process or service configured to implement static analysis or static application security testing. The process or service configured to implement static analysis or static application security testing may be referred to herein as an "analysis service." Such an analysis service may also be configured to perform dynamic analysis using one or more dynamic analysis techniques. As a result of this scan, one or more security vulnerabilities and/or the location of those vulnerabilities within the source code representation may be identified. Vulnerabilities may be, for example, instances in the code where sensitive data may be made available to a malicious attacker or where execution of code may make control of a software system available to unprivileged users. For example, in source code that processes credit card numbers, any clear text (unencrypted) storage of the credit card number may be considered a security vulnerability (also referred to herein simply as a "vulnerability") due to the possibility of making such information available to an attacker.

The location of the vulnerabilities may be based on position analysis information, which may be determined from a dataflow trace of a source code representation by first, generating an abstract representation of the source code representation such as, for example, an abstract syntax tree representation. Locations within the abstract representation that impact the control of data within the dataflow may be determined based on a dataflow analysis. For example, a function call that has a data element as an argument may impact the control of data within the dataflow. One or more analysis start locations (also referred to herein as "start nodes") may also be identified within the source code representation. As a source code representation may have multiple execution paths, each of the one or more analysis start locations may have one or more corresponding analysis stop locations (also referred to herein as "stop nodes"). For example, a function entry point may be an analysis start location. The function may have multiple exit points (e.g., early returns, exceptions, and a final return) so each of those exit points may be a corresponding analysis stop location for the analysis start location. In some embodiments, start locations (or start nodes) may be referred to as "source" locations and the corresponding end locations (or end nodes) may be referred to as "sink" locations.

Based on the abstract representation, the locations within the abstract representation that impact the control of data within the dataflow, and the start and stop locations, a dataflow analysis may then be performed to determine the locations within the source code representation where data may be most fully controlled by, for example, a malicious attacker. From this dataflow analysis, position analysis information may be determined as described herein. In some embodiments, a correspondence between locations within the abstract representation and the analysis start and/or stop locations may be determined based, at least in part, on the structure of the source code representation and on any compilers and/or interpreters that may be used in association with the source code representation. Such a correspondence may be used to enhance the position analysis.

Using the position analysis information, one or more security patch rules may be generated based on the source code representation and/or the vulnerabilities. Security patch rules (also referred to herein simply as "patch rules") are rules for applying security patches to a source code representation based on the one or more system security vulnerabilities, and which may include search and replace criteria for determining the most ideal location to apply such security patches. Security patch rules may be generated by selecting one or more patch rules from a patch rules repository. The security patch rules may be authored by, for example, a security subject matter expert. Such rules may be selected and/or authored based on domain knowledge, previous experience, known vulnerabilities, or known computer system conditions. For example, in the above instance with source code that processes unencrypted credit card numbers, a security patch rule may be authored to encrypt the credit card number by a security subject matter expert and stored in a patch rules repository. The rule may be generated by automatically selected from patch rules repository by an auto-remediation engine based on the detected vulnerability. The rule may include optional position analysis information based on precise locations within the source code representation or may also include a search method specifying that the best location may be determined based on the position analysis information determined from, for example, a dataflow analysis.

A security patch rule may include rules for applying a plurality of possible patches to the source code representation based on the vulnerabilities including, for example, multiple types of encryption to implement, multiple source code modifications, or combinations of these and/or other types of patches to the source code. For example, a security patch rule may include a patch to add encryption calls to the source code and also may include variations of that patch that choose different encryption methodologies. A security patch rule may specify rules for applying security patches in terms of statements generally of the form "if a vulnerability exists at a determined location, apply a selected patch to the source code representation at a location relative to the determined location." The determined location may be determined by the position analysis. Such security patch rules may be specified as name-value pairs, as scripts (e.g., XML scripts, JSON scripts, or JavaScript), or as some other rules representation.

One or more of the plurality of possible patches in the security patch rule may then be applied to the source code representation to produce one or more at least partially patched source code representations with the location of the security patch determined based on the position analysis. The at least partially patched source code representations may, for example, not be completely patched due to their missing the final specification of additional values (also referred to herein as "optional parameters") indicated in the security patch rule. As an example of such partial patches, a security patch rule to add encryption to a source code representation may specify an encryption method that requires a security key obtained from a security key file located on a computer system that the source code may be executed on. As different implementations may locate the security key file in different locations, the location of the security key file may be left as an additional parameter (i.e., to be specified later) in the security patch rule. Similarly, the security patch rule may specify an encryption method that obtains a security key from a location specified by an environment variable, the value of which may also be an additional parameter in the security patch rule.

The one or more at least partially patched source code representations may then be verified and one of the partially patched source code representations may then be selected for implementation. Finally, the selected security patch rule with the position analysis information may be used to patch the source code representation and to commit the patched source code representation for use in place of the formerly vulnerable code. In some embodiments, additional testing and/or verification may be applied to the updated code including, but not limited to, unit testing, regression testing, black box testing, static analysis, dynamic analysis, or other such testing methodologies.

FIG. 1 illustrates an example environment 100 where position analysis is used to determine the position of source code vulnerabilities in accordance with an embodiment. A source code representation 102 may be analyzed to generate a syntax tree representation 104 of the source code. One example of a syntax tree representation (also referred to herein as an "abstract representation" or more simply as an "AST") is an abstract syntax tree representation of the source code. An abstract syntax tree representation of the source code is a data structure that comprises nodes and edges. Each node corresponds to one or more parts of the source code representation and each edge corresponds to relationships, groupings, and/or links between those nodes. A node may have zero, one, or more edges issuing from the node (i.e., may have zero, one, or more "child" nodes) and may have zero or one edges entering the node (i.e., may have zero or one "parent" nodes). A node with zero child nodes is a leaf node, which generally represents a single statement or sub-statement. A node with zero parent nodes is a root node, which generally represents the entry point for the entire source code representation. In some embodiments, abstract syntax tree representations may have sub-trees which may, for example, represent functions, libraries, routines, or other such subdivisions of the source code representation. An abstract syntax tree representation may eliminate or may only implicitly include some parts of a source code representation if those parts are not necessary for representing the syntax of the source code representation. An example of parts of the source code representation that may be only implicitly included are grouping parentheses, which may be implied by the child nodes. An example of an abstract syntax tree is illustrated herein in FIG. 8.

Following the generation of the AST, nodes within the AST that impact the control of data may be identified 106. Such nodes may be referred to herein as "data impact nodes." A node within the AST that impacts the control of data is a node that changes the value of a data item. In a simple example, the statement "my_string="ABCDEF" may be represented by three nodes in the AST. The first node represents the equals ("=") sign and that node may have two child leaf nodes, the first of which represents the variable "my_string" and the second of which represents the value "ABCDEF." In this simple example, the first node, with the equals sign, is a node within the AST that impacts the control of data. In a more complex example, the statement "my_string="ABC"+my_function(user_data)" may be represented by a first node that represents the equals sign, a first child leaf node that represents the variable "my_string", a second child node that represents the plus ("+") sign, a first child leaf node of the plus sign node that represents the value "ABC", and a second child node of the plus sign node that represents the function call "my_function(user_data)". The second child node of the plus sign node that represents the function call "my_function(user_data)" may also have a plurality of nodes that represent the operations of the function. In this example, several of the nodes may impact the control of data including the equals sign node, the plus sign node, and the function call node.

In addition to generating the AST, the source code representation 102 may also be analyzed to determine the start and stop points 108 within the source code representation. Start points are locations within the source code representation where data flow analysis may begin. Start points may be entry points into the source code representation (i.e., the first line of the source code representation), entry points into functions or procedures within the source code representation, beginnings of blocks of specific functionality (e.g., an encoding routine or a routine that may manipulate one or more sensitive data items), or some other such start point. Each start point may have a corresponding set of one or more stop points, which are locations within the source code representation where the data flow analysis that started at the start point may end. For example, a start point for a function may be the entry point of the function. In an embodiment where the function has a single exit point such as, for example, a return statement, the single stop point corresponding to that start point may be that return statement. In an embodiment where the function has multiple exit points (e.g., an early return value, an error handler, multiple data transport methods, and a final exit point), each of those exit points may represent stop points corresponding to the start point. In some embodiments, a correlation between the start and stop points and the nodes in the AST may be determined based on, for example, an identified compiler, interpreter, or some other processor of the source code representation.

With the source code representation, the AST, the nodes that impact the control of data, the start and stop points, and/or other such data or metadata associated with the source code representation, a data flow analysis may be performed 110 to determine the flow of data from the start nodes (also referred to herein as a "start location") to the stop nodes (also referred to herein as a "stop location"). A data flow analysis may use forward analysis techniques (i.e., from the start nodes to the stop nodes), backward (or reverse) analysis techniques (i.e., from the stop nodes to the start nodes), or some other such techniques. A data flow analysis may be used to determine the actual and/or potential values for each variable at one or more locations within a source code representation. A data flow analysis may also be performed as described in U.S. patent application Ser. No. 13/830,510 entitled "TECHNIQUES FOR TRAVERSING REPRESENTATIONS OF SOURCE CODE", which is incorporated by reference herein.

In an illustrative example, a data flow analysis may be performed on a simple function that sets a variable value to zero and then iteratively (i.e., within a loop) adds one to that variable value. If the loop executes ten times, the potential values for the variable are from zero to ten. Before the initial assignment, the actual value of the variable may be unknown and the potential value may be anything. After the initialization and before the first iteration, the actual value for the variable is zero. After the fifth iteration, the actual value for the variable is five. After the tenth iteration, the actual value for the variable is ten.

The data flow analysis may then be used to calculate positions 112 (also referred to herein as "data positions") within the source code representation to produce position information 114 as described herein. Position information 114 may include the line and column number information within the source code of the start and stop locations as well as line and column number information of variables, functions, operators (addition, subtraction, assignment, etc.), and other such data control entities. Position information 114 may also include the degree of control of data that, for example, a malicious attacker may have based on the data flow analysis as described herein. For example, a variable may be assigned early in the data flow that may be potentially controlled by a malicious attacker. At that point, the malicious attacker may have full control of the variable. In an embodiment, the position may be chosen based on that position being closest (in traversal order) a stop node based on a proximity measure such as, for example, execution order (e.g., the number of execution steps between the position and the stop node), a distance (in number of edges) between a node corresponding to the position and the stop node, a weighted distance between a node corresponding to the position and the stop node, or some other such proximity measure. At a later point in the data flow, that variable may be concatenated (i.e., appended to) a different variable. At that point, the malicious attacker may only have control of the right side of the resulting variable. Degree of control data and how such data may be produced is described in more detail below.

Figure 2:
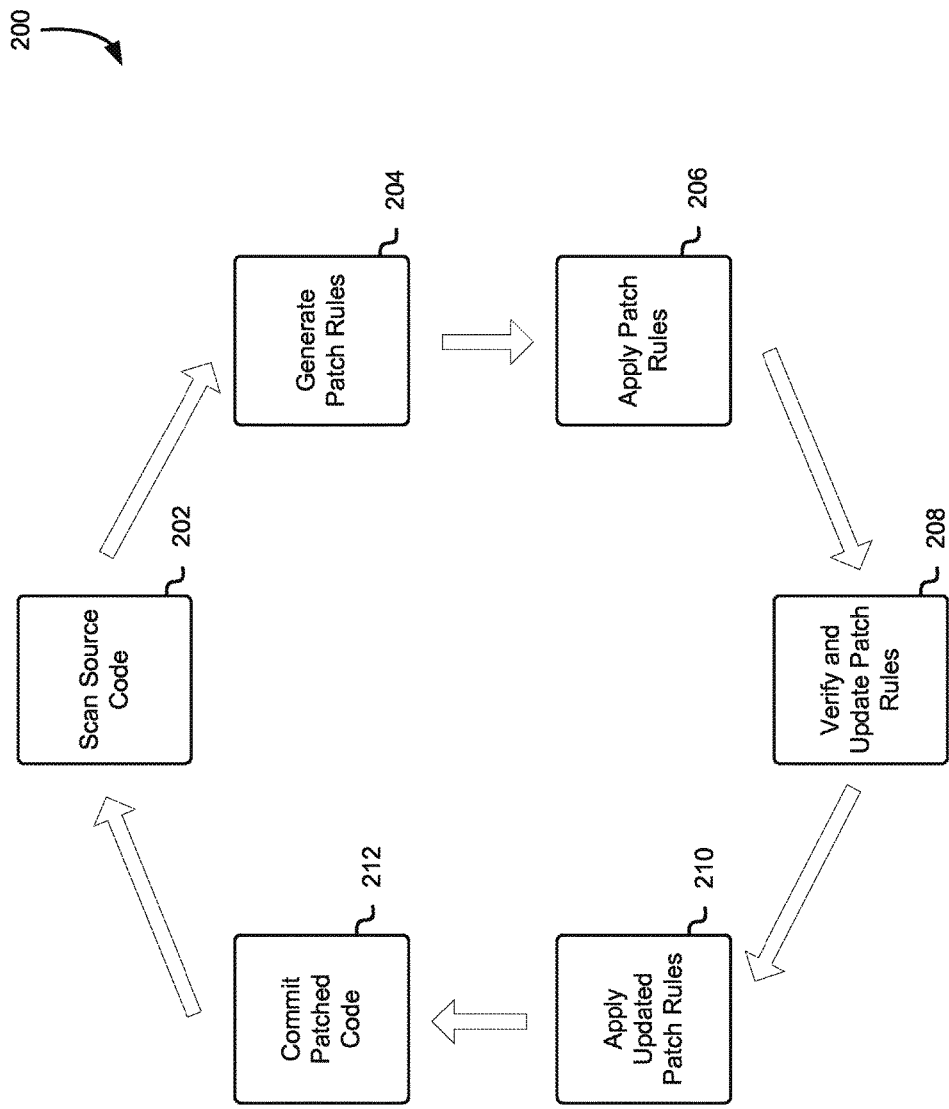
FIG. 2 illustrates an example workflow for performing auto-remediation on computer system security vulnerabilities in source code in accordance with an embodiment.

FIG. 2 illustrates an example workflow 200 for performing auto-remediation on computer system security vulnerabilities in source code as described herein in connection with FIG. 1 and in accordance with an embodiment. The workflow 200 illustrated in FIG. 2 may be performed by an auto-remediation engine and/or by one or more components thereof. At least a portion of the workflow 200 illustrated in FIG. 2 may also be performed by external components associated with the auto-remediation engine such as, for example, a static security analysis application. First, a representation of source code may be scanned 202 to, for example, detect security vulnerabilities. The source code representation may be a listing (i.e., the textual representation of a program) of source code that may be compiled to generate machine code such as, for example, code written in BASIC, C, C++, Fortran, Lisp, or other such languages. The source code representation may also be a listing of source code that may be compiled into bytecode such as, for example, code written in C#, Java, or other such languages. The source code representation may also be a listing of source code that may be interpreted such as, for example, code written in Java, JavaScript, Perl, PHP, Python, Ruby, a scripting language (e.g., TCL or Lua), or other such interpreted languages. In some embodiments, the source code representation may include the machine code generated by a compiler, bytecode generated by an interpreter, or an intermediate representation of the source code such as, for example, an abstract syntax tree, or some other data structure.

As described above, the representation of source code may be scanned for security vulnerabilities using static analysis and/or dynamic analysis techniques. In static analysis (also referred to herein as "static application security testing"), the representation of the source code may be scanned while the source code is not executing, and where branch points are located by the scan with multiple possible outcomes, each possible branch may be analyzed. For example, a source code statement that effectively states "if a variable is less than zero, perform a first set of actions and if not, perform a second set of actions" may be analyzed as if the variable is less than zero as well as if the variable is not less than zero. In dynamic analysis, the representation of the source code may be scanned while the source code is executing. Such analysis only analyzes branches in code that are taken during the dynamic analysis. For example, in the example above, if the variable is never less than zero during the dynamic analysis, the analysis of the first set of actions may never be performed.

In some embodiments, in order to perform auto-remediation on computer system security vulnerabilities in source code using static analysis and/or dynamic analysis, the static and/or dynamic analysis tools may be altered or enhanced to provide additional information (also referred to herein as "additional metadata") to the auto-remediation engine. For example, some method of detecting conflicts when merging security patches may be needed such as, for example, by generating file name hashes. Additionally, some consistent method of determining line numbers and/or column numbers (i.e., for the beginning and end columns) of each line may be needed. Another enhancement to static and/or dynamic analysis tools may be enhanced position analysis as described herein. One example of enhanced position analysis may be that the static and/or dynamic analysis tools may determine what portion of a string or input an attacker may control throughout a source code representation in order to determine a best location for applying a security patch. Such enhancements may provide the additional metadata as, for example, part of the vulnerability data as described herein. As may be contemplated, the alterations or enhancements to the static and/or dynamic analysis tools described herein are illustrative examples and other such alterations or enhancements to the static and/or dynamic analysis tools may be considered as within the scope of the present disclosure.

After the representation of the source code is scanned 202 for security vulnerabilities, those security vulnerabilities, combined with the source code representation may be used to generate one or more patch rules 204 which may include a plurality of possible patches that may be applied to the source code representation to address the security vulnerabilities. In an embodiment, additional data and/or metadata about the vulnerabilities may be provided as a result of the scanning when the representation of the source code is scanned 202. Such data and/or metadata may be used to generate the one or more patch rules 204 by, for example, indicating the type of the vulnerability, indicating the severity of the vulnerability, determining the priority for addressing the vulnerability, determining a position within the source code representation where a patch may be best applied to address the vulnerability, providing suggestions for additional values in the security patch rule, or to address other such factors that may be used to generate the one or more patch rules 204. For example, as a result of a scan of the source code representation, a plurality of security vulnerabilities may be identified. Each security vulnerability may have an associated security patch rule that may specify a plurality of possible patches that may be used to address the security vulnerability. The data and/or metadata associated with the vulnerabilities may determine, for example, the most effective location within the source code representation to apply the security patch rule. The scope and content of the one or more security patch rules is described in more detail below.

After the security patch rules are generated, the generated security patch rules may be applied 206 to the source code representation. As described above, a security patch rule may include a plurality of possible patches to the source code representation and one or more of the plurality of possible patches may be applied to the source code representation to produce one or more partially or fully patched source code representations. Each of the one or more partially or fully patched source code representations may then be provided along with the generated security patch rules so that the security patch rules may be verified and updated 208. The one or more partially or fully patched source code representations may be provided with the generated security patch rules to illustrate the results of applying the security patch rules to the source code representation.

When the security patch rules are verified and updated 208, the security patch rules may have missing additional values provided, may have one or more of a plurality of suggested solutions selected, may have locations to apply a patch determined, or may have other verification and update operations performed. For example, a security patch rule may be generated and applied that may have two different suggested solutions to address the vulnerability, each solution of which may have one or more missing additional values, and with two different possible locations to apply each of the suggested solutions. The security patch rule may include four possible solution choices (i.e., each of the two possible solutions in each of the two possible locations) with missing additional values for each. The process where the security patch rules are verified and updates 208 may perform operations to select one or the four possible solution choices and provide the missing additional values for the chosen solution, as described above.

After the security patch rules are verified and updated 208, the security patch rule may be used to patch the source code representation by applying the updated security patch rule 210. The patched source code representation may then be integrated with the rest of the source code by, for example, committing the code 212 to a source code repository before the next scan of the source code to find additional vulnerabilities. As described above, there may be additional testing and/or verification operations in the workflow 200 described in FIG. 2 including, but not limited to, additional security subject matter expert verification, additional end-user or customer verification, unit testing, regression testing, black box testing, static analysis, or dynamic testing. Such additional testing and/or verification operations may be automated, may be manually performed, or may be performed using a combination of these and/or other techniques.

Figure 3:
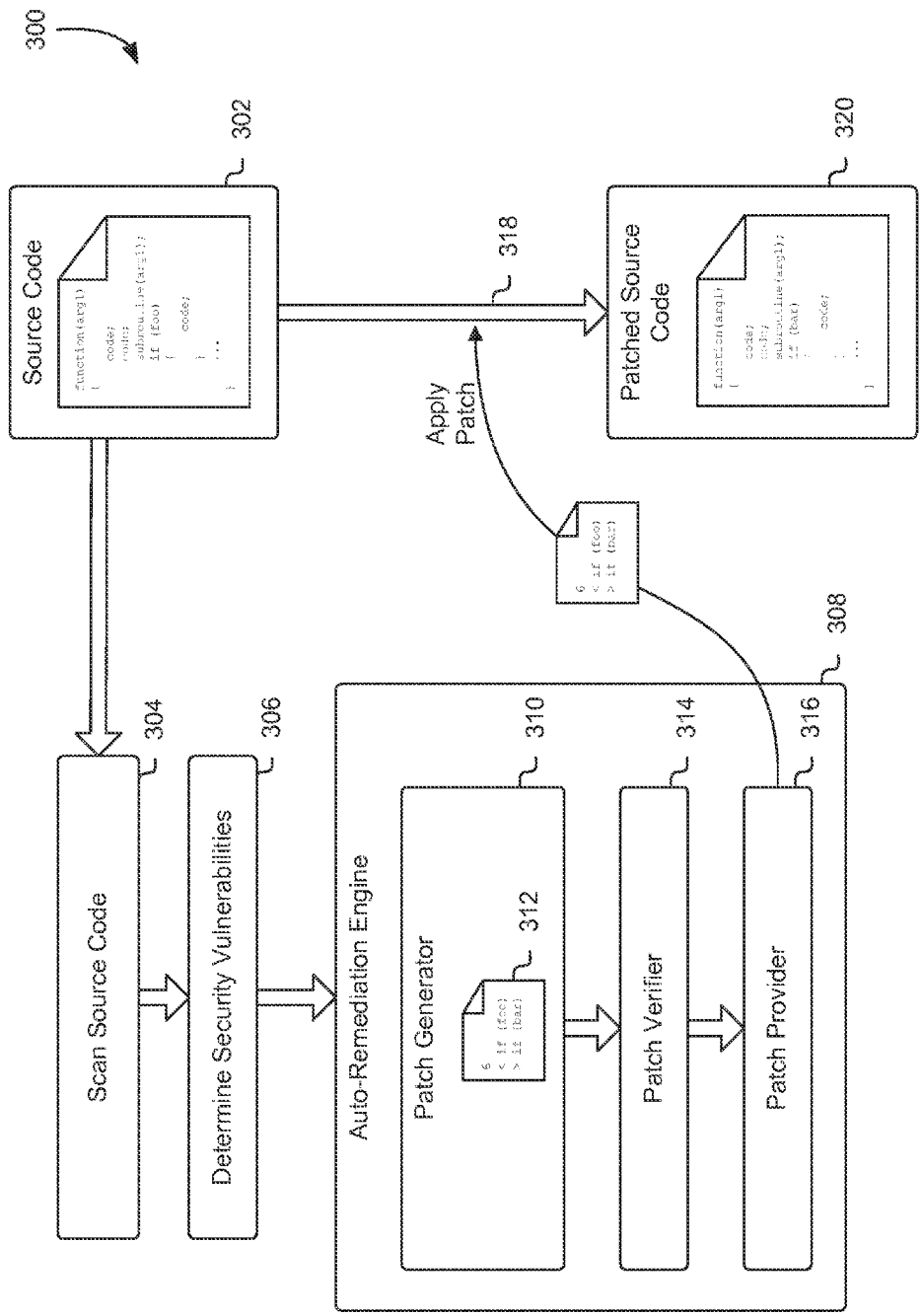
FIG. 3 illustrates an example environment for performing auto-remediation on computer system security vulnerabilities in source code in accordance with an embodiment.

FIG. 3 illustrates an example environment 300 for performing auto-remediation on computer system security vulnerabilities in source code as described herein in connection with FIG. 2 and accordance with an embodiment. A source code representation 302 may be scanned 304 by a source code scanner to determine security vulnerabilities 306 as described herein. The security vulnerabilities 306 may then be provided to a process such as the auto-remediation engine 308, which may be configured to generate a patch to the source code representation based at least in part on the security vulnerabilities 306 as described herein. The process to scan the source code representation may be performed by an external process such as, for example, a process associated with a static analysis service as described herein. The process to scan the source code representation may also be performed by the auto-remediation engine or by a process associated with the auto-remediation engine 308. Similarly, the process to determine security vulnerabilities 306 may be performed by an external process such as, for example, a process associated with static analysis, by the auto-remediation engine 308, or by a process associated with the auto-remediation engine 308.

The auto-remediation engine 308 may then use the security vulnerabilities 306 so that a patch generator 310 may generate a patch to remediate one or more of the security vulnerabilities 306 and the generated patch 312 may then be verified by a patch verifier 314 using one or more of the techniques described herein. The generated patch 312 may then be provided by a patch provider 316 to one or more consumers such as, for example, a utility process configured to receive the patch and use the information specified therein to patch the source code. In some embodiments, the auto-remediation engine 308 and/or a process associated with the auto-remediation engine 308 may apply the patch 318 to the source code representation 302 to produce patched source code 320.

Figure 4:
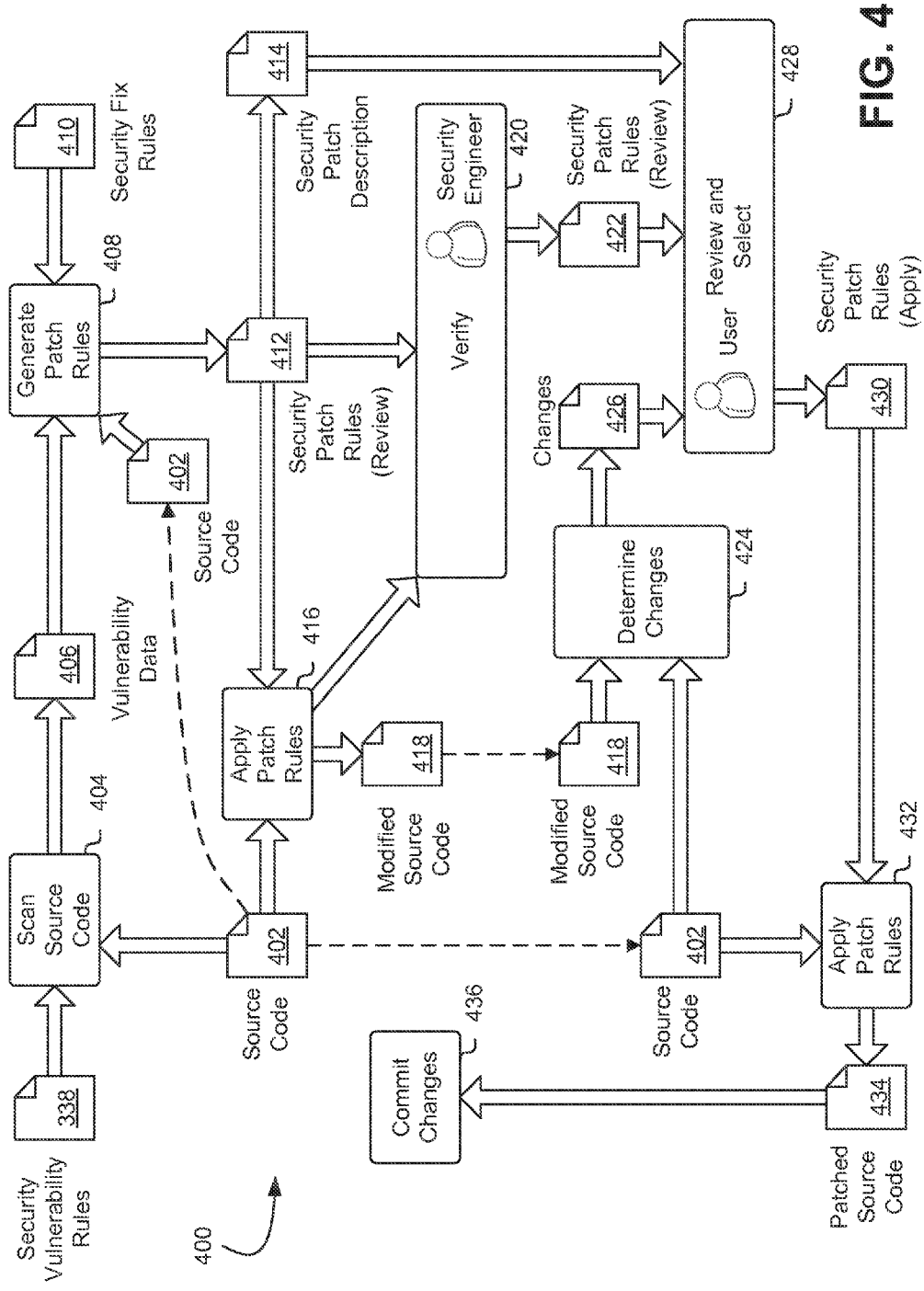
FIG. 4 illustrates an example data flow diagram for performing auto-remediation on computer system security vulnerabilities in source code in accordance with an environment.

FIG. 4 illustrates an example data flow diagram 400 for performing auto-remediation on computer system security vulnerabilities in source code as described herein in connection with FIG. 2 and in accordance with an environment. A source code representation 402 of a subset of the set of source code associated with a computer system may be scanned 404 to produce vulnerability data 406 as described above. The vulnerability data 406 may include data associated with the vulnerability including, but not limited to, the location, severity, and impact of the vulnerability if it is not remediated. The vulnerability data 406 may also include metadata associated with the vulnerability including, but not limited to, the basis for identifying the vulnerability or details about how the vulnerability may impact the source code representation. For example, the vulnerability data 406 may include position data and/or metadata that may be used to determine a location within the source code representation where the source code may be most vulnerable or that may be used to determine a location within the source code representation where a security patch may be most effectively applied to remediate the vulnerability. These operations, to be performed efficiently, can be performed by a computer.

In some embodiments, the data and/or metadata associated with the vulnerability may be determined by applying one or more security vulnerability rules 438. Security vulnerability rules 438 may include rules authored by a security subject matter expert and/or may include rules based on specific domain knowledge. Security vulnerability rules 438 may also include one or more security vulnerability criteria that may be used to determine whether a security vulnerability exists. For example, in some programming languages it may be a potential vulnerability to have an assignment operator (a single equals sign) inside a conditional test rather than a compare operation (a double equals sign). A security vulnerability rule may enable detecting such vulnerabilities by searching for conditional statements in a source code representation with single equals signs within the condition. The security vulnerability criteria may include the criteria to identify conditional statements in the source code representation and may also include the criteria to distinguish assignment operations from compare operations. As different computer system languages may have different types of conditional statements and/or different operators, the security vulnerability criteria may also include language specific criteria. In some embodiments, the security vulnerability rules may be authored by security subject matter experts. In some embodiments, the security vulnerability rules may also be determined by experimentation such as, for example, by simulating the execution of source code. Such security vulnerability rules may be stored in a security vulnerability rules table that is configured to allow an auto-remediation engine to selectively apply the rules to a source code representation and use the results of the rules to identify security vulnerabilities.

The vulnerability data 406 combined with one or more security fix rules 410 by an auto-remediation engine to select and/or generate patch rules 408. In an embodiment, the source code representation 402 may also be combined with the vulnerability data 406 and the one or more security fix rules 410 to select and/or generate patch rules 408. The patch rules may be selected and/or generated by a patch generator such as the patch generator 310 described in connection with FIG. 3. The security patch rules may first be selected and/or generated in review phase 412. The security patch rules in review phase 412 may be generated with a security patch description 414. The security patch description 414 may be a description of the security patch rules and may also include a description of any additional parameters that are required to complete the security patch rule.

For example, the security patch description 414 may include a title, a brief description of the security patch, a consideration, and/or intrusiveness information. The consideration may be a measure of how different systems and/or subsystems may be affected by the security patch. The consideration may include one or more metrics indicating how the different systems and/or subsystems may be affected by the security patch. The intrusiveness information may be a scale (e.g., "low," "medium," and "high") indicating the amount of changes in the security patch. The security patch information may be configured to allow an end-user and/or a security subject-matter expert to make an informed decision about whether to accept the auto-remediation suggestion specified by the security patch rules. In some embodiments, the security patch description 414 may be included with the security patch rule in review phase 412. In some embodiments, the security patch description 414 may be separate from the security patch rule in review phase 412.

The security patch rules in review phase 412 may then be verified 420 to ensure, for example, that the security patch rules in review phase 412 were properly selected and/or generated and additionally to ensure that the security patch rules in review phase 412 may provide remediation for the security vulnerabilities identified in the vulnerability data 406. The security patch rules in review phase 412 may be verified 420 by a patch verifier such as the patch verifier 314 described in connection with FIG. 3 and/or may be verified by a subject-matter expert such as, for example, a security engineer. In the example illustrated in FIG. 4, the security patch rules in review phase 412 may be verified 420 by a security engineer. In some embodiments, the security patch rules in review phase 412 may be verified 420 by a security subject matter expert, or by an end-user, or by some other such person. In some embodiments, the security patch rules in review phase 412 may be verified 420 by an automated process such as, for example, by an expert system associated with the auto-remediation engine. In some embodiments, the security patch rules in review phase 412 may be verified 420 by a combination of persons and processes and/or may also be verified a plurality of times by different persons or processes. In some embodiments, the security patch rules in review phase 412 may be applied 416 to the source code representation 402 by, for example, a security patch applicator to produce a set of modified source code representations 418. Each of the modified source code representations 418 may be generated by applying one or more of the security patch rules in review phase 412 to the source code representation 402. The modified source code representations 418 may be used in combination with the security patch rules in review phase 412 when the security patch rules in review phase 412 are verified 420 to, for example, illustrate the effects of applying each of the security patch rules in review phase 412 to the source code representation 402.

The verified security patch rules in review phase 422 may then be provided for review and selection 428 to produce the security patch rules in apply phase 430 as described herein. In the example illustrated in FIG. 4, the verified security patch rules in review phase 422 may be provided to a user (e.g., an end user) for review and selection 428. In some embodiments, the verified security patch rules in review phase 422 may also be provided to a security subject matter expert, or to a system administrator, or to an automated process (e.g., an expert system), or to a combination of these and/or other such entities for review and selection 428. The security patch description 414 may also be provided to aid in the review and selection and, in some embodiments, a set of changes 426 may also be provided. The set of changes 426 may be produced by the auto-remediation engine by comparing the source code representation 402 to one or more of the set of modified source code representations 418 to determine the changes 424 suggested by each of the security patch rules in review phase 412.

The security patch rules in apply phase 430 may then be applied 432 to the source code representation 402 by a security patch applicator to produce the patched source code 434. In some embodiments, the security patch rules in apply phase 430 may undergo one or more additional verification steps before they are applied 432 to the source code representation 402 by the security patch applicator. In some embodiments, the patched source code 434 may also undergo one or more additional verification steps such as, for example, unit testing, regression testing, black box testing, or other such testing, before the patched source code is committed 436 to a source code repository for integration with the set of source code associated with the computer system.

Figure 5:
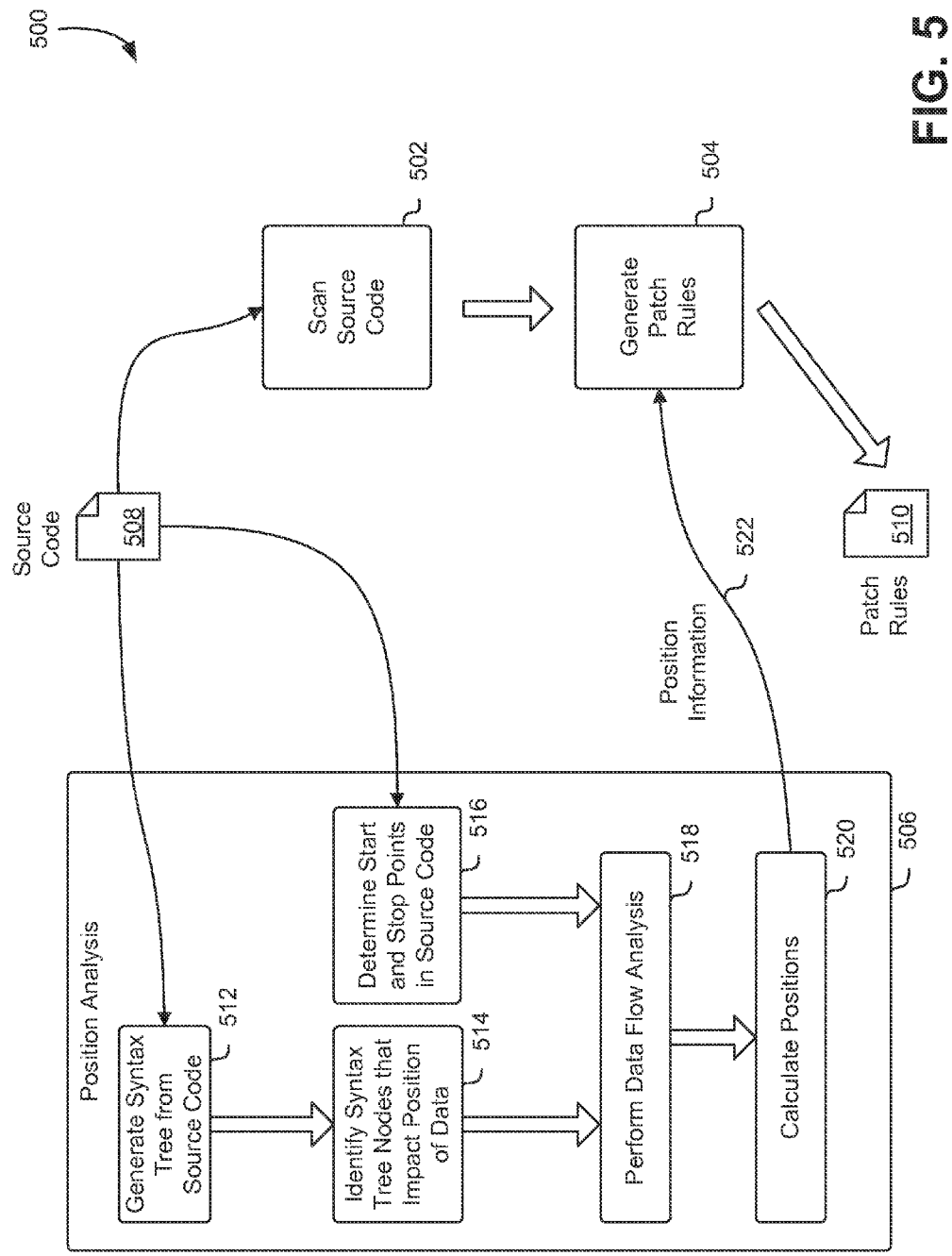
FIG. 5 illustrates an example workflow where position analysis is used to determine the position of source code vulnerabilities in conjunction with an auto-remediation workflow and in accordance with an embodiment.

FIG. 5 illustrates an example workflow 500 where position analysis is used to determine the position of source code vulnerabilities in conjunction with an auto-remediation workflow as described herein in connection with FIGS. 1 and 2 and in accordance with an embodiment. In the example illustrated in FIG. 5, the scan source code 502 corresponds to the scan source code representation as described above and the generate patch rules 504 corresponds to the generate patch rules also as described above. The patch rules 510 are the result of the generate patch rules 504 and may serve as an input to the apply patch rules described above. The position analysis 506 may include generating a syntax tree 512 from the source code representation 508, identifying syntax tree nodes that impact the position of data 514, determining start and stop points in the source code 516, performing the data flow analysis 518, and calculating positions 520, all as described above. The position information 522 may be used to generate the patch rules 504 as described above.

Figure 6:
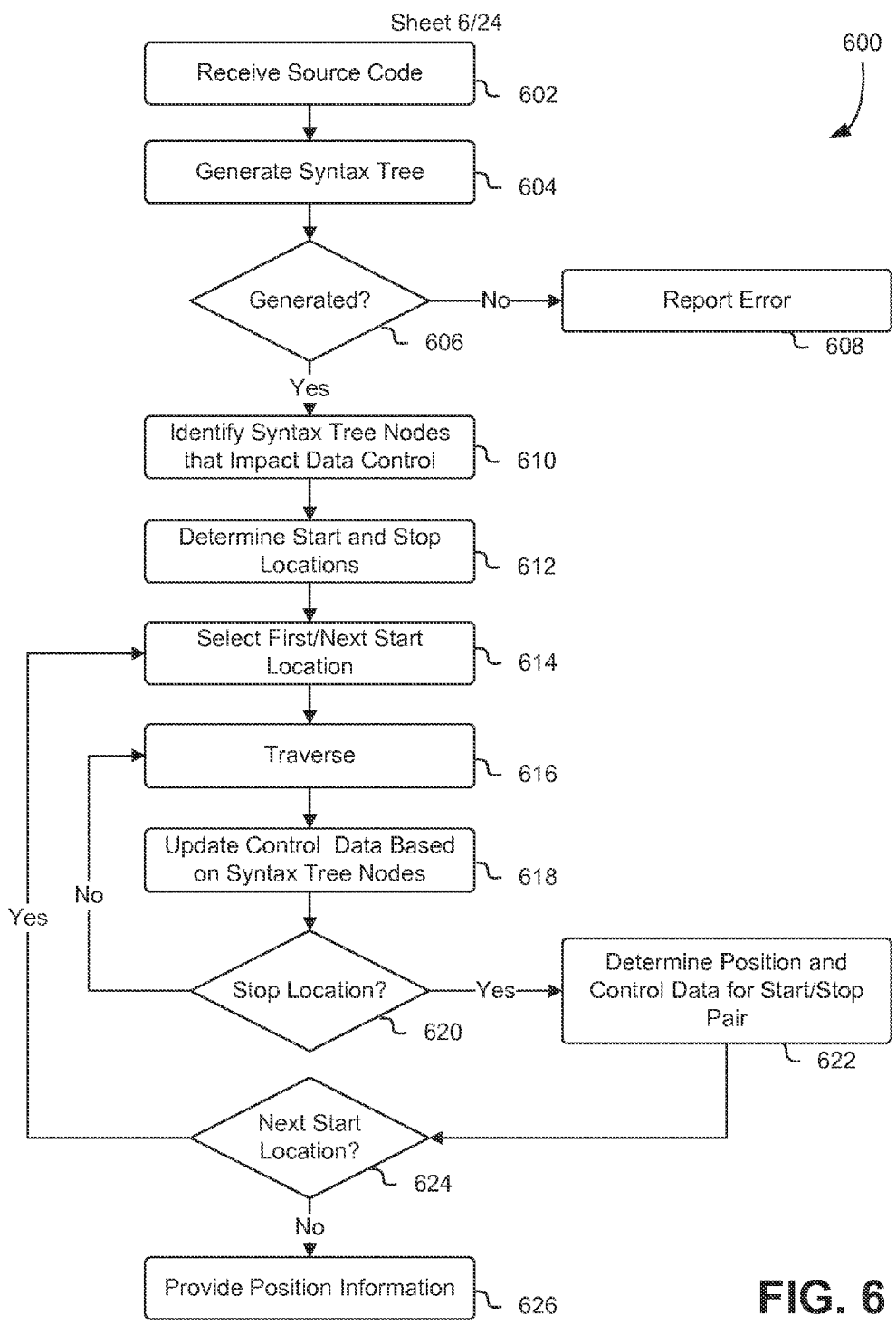
FIG. 6 illustrates an example process for determining the position of source code vulnerabilities using position analysis in accordance with an embodiment.

FIG. 6 illustrates an example process 600 for determining the position of source code vulnerabilities using position analysis as described herein in connection with FIG. 1 and in accordance with an embodiment. At least a portion of the process 600 illustrated in FIG. 6 may be performed by a process, system, or service configured to perform position analysis such as the position analysis 506 described herein in connection with FIG. 5. In a first step in position analysis, source code may be received 602 and a syntax tree may be generated as described herein. If the syntax tree is not successfully generated 606, an error may be reported 608 by, for example, generating an alert, sending an email, displaying an error message, or by some other such error reporting method. If the syntax tree is successfully generated, the process of position analysis may proceed by identifying syntax tree nodes that impact data control 610 and by determining start and stop locations 612 within the source code representation. In some embodiments, the start and stop locations may be pre-determined by a separate process configured to scan the source code representation. In some embodiments, the start and stop points may be associated with nodes in the syntax tree based on, for example, pre-processing the source code representation using a compiler pre-processor.

Position analysis may continue by first selecting 614 a first start location from the identified start locations and traversing 616 the source code representation. While traversing 616 the source code representation, the position analysis may generate a data flow for data items present in the traversal and may also update the position data for data items in the data flow (i.e., line number and column information). Additionally, while traversing 616 the source code representation, the position analysis may update position data associated with the control of the data items in the data flow 618 as described herein. The position analysis may continue traversing until a stop location 620 corresponding to the start location is found. From the position data determined during traversal, a set of position values and/or a set of control values may be determined for the start/stop pair 622. In an embodiment, there may be a plurality of stop locations corresponding to the start location. In such an embodiment, the set of position data values and/or the set of control data may be aggregated for all stop locations or a set of position data and/or a set of control data may be determined for each pair of start and stop locations. The position analysis may next determine if there are more start locations to process 624 and, in the event that there are not, may provide the position information 626 comprising one or more of the sets of position data and/or one or more of the sets of control data.

Figure 7:
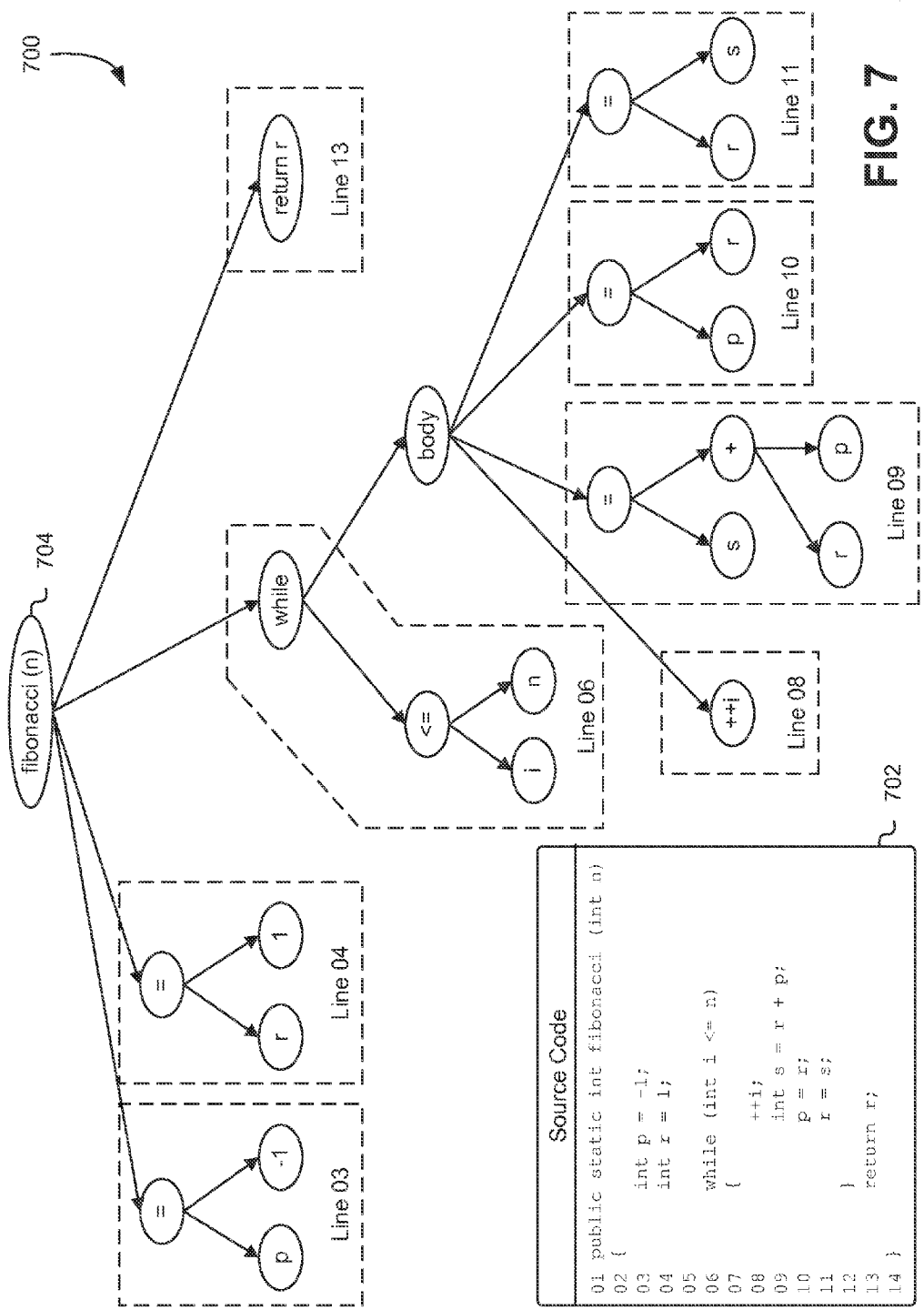
FIG. 7 illustrates an example of an abstract syntax tree used for determining the position of source code vulnerabilities in accordance with an embodiment.

FIG. 7 illustrates an example AST 700 used for determining the position of source code vulnerabilities as described herein in connection with FIG. 1 and in accordance with an embodiment. The example AST illustrated in FIG. 7 is an AST representation of a function to calculate the n-th Fibonacci number (as expressed by the sequence {1, 1, 2, 3, 5, 8, 13, 21, 34, . . . }). The entry point of the function is the root node 704 of the AST 700. The first child node of the root node 704 corresponds to line 03 of the source code 702 of the function and is illustrated as a sub-tree of three nodes corresponding to the first assignment operation. Note that the parenthesis on line 02 of the source code 702 and the parenthesis on line 14 of the source code 702 are not explicitly shown in the AST 700 and are, as described above, implicit. The second child node of the root node 704 corresponds to line 04 of the source code 702 of the function and is illustrated as a sub-tree of three nodes corresponding to the second assignment operation. The third child node of the root node 704 corresponds to line 06 of the source code 702. The third child node of the root node 704 is the "while" node and, as illustrated in FIG. 7, has a condition subtree on the left and a body subtree on the right. The body subtree represents the loop body (i.e., the part of the source code 702) and corresponds to lines 08 to 11 of the source code 702. Note that, as with the parenthesis on line 02, the parentheses on lines 07 and 12 are not explicitly shown in the AST 700. Finally, the fourth child node of the root node 704 corresponds to line 13 of the source code 702. As may be contemplated, the AST illustrated in FIG. 7 is merely an example and other such abstract representations of source code may be considered as within the scope of the present disclosure.

Figure 8:
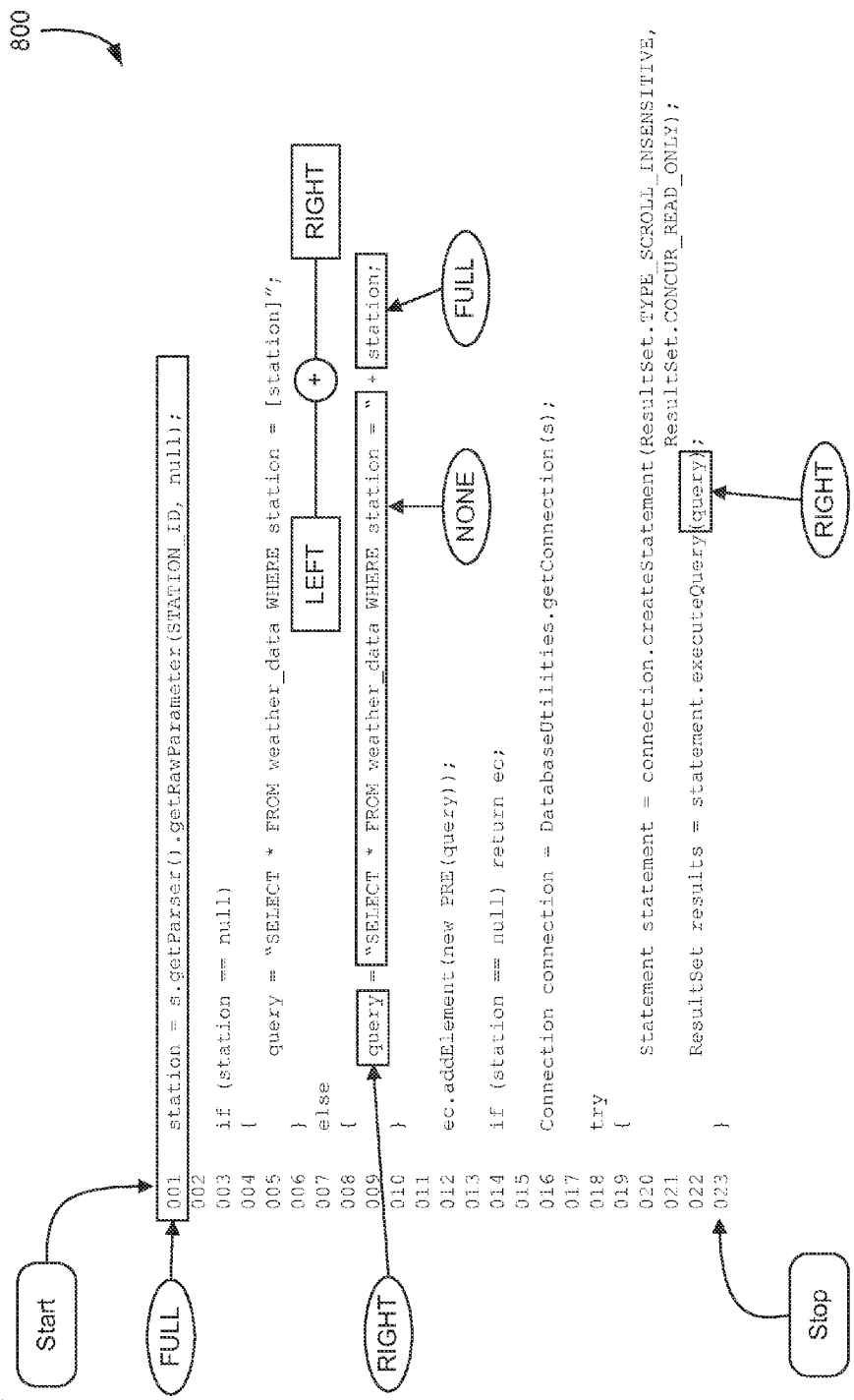
FIG. 8 illustrates an example application of position analysis to source code in accordance with an embodiment.

FIG. 8 illustrates an example 800 of the application of position analysis to a source code representation as described herein in connection with FIG. 1 and in accordance with an embodiment. Line 001 is a start position (i.e., the entry point for the data flow analysis described herein). Line 001 is also a location where an entity (e.g., a malicious attacker) may have full control of the variable "station" by, for example, controlling the object "s," the parser, and/or the parameter "STATION_ID." No manipulations of the variable "station" occur between lines 002 and 008, so line 009 may be the first position where the control of the variable "station" may change. On line 009, the entity may have full control of the variable "station" and may have no control (as indicated by "none") of the literal "SELECT" statement. The entity may thus have control of the right portion of the variable "query." With no manipulations of the variable "query" between lines 010 and 021, the entity may still have control of the right portion of the variable "query" on line 022 and may thus have partial control of the variable "results" on line 022. Line 023 is the single stop position corresponding to the start position on line 001 in the example illustrated in FIG. 8.

FIG. 9 illustrates an example position analysis matrix 900 used for determining the position of source code vulnerabilities as described herein in connection with FIG. 1 and in accordance with an embodiment. The entries in the position analysis matrix 900 correspond to the degree of control that an entity may have of a particular vulnerability. The entries in the body of the matrix and column and row headers are control states and, in the example illustrated in FIG. 9, represent full control ("FULL"), left side control ("LEFT"), right side control ("RIGHT"), center control ("CENTER"), left and right side control, but not center control ("LEFTRIGHT"), and no control ("NONE"). The entries in the first column (the "Left Side") represent the degree of control that an entity may have of the left (or first) portion of a variable. The entries in the first row (the "Right Side") represent the degree of control that an entity may have of the right (or second) portion of a variable. The entries in the body of the position analysis matrix 900, referred to herein as "result control states," represent the degree of control that an entity may have of the variable as a result of performing an operation that combines the left portion of the variable with the right portion of the variable.

For example, a statement such as "result=first+second" may be used to combine two string values, the first of which is specified by the variable "first" and the second of which is specified by the variable "second." In the example, let the value of the variable "first" be "ABCD" and the value of the variable "second" be "1234." In such an example, the value of the variable "result" would be "ABCD1234." If an entity has full control (corresponding to a full control state) over the variable "first" and no control (corresponding to a "none" state) over the variable "second" then, looking at the position analysis matrix 900 with "FULL" on the Left Side and "NONE" on the right side, the control of the variable "result" is "LEFT." In this example, the entity may have control over the "ABCD" portion of the variable "result" but not control over the "1234" portion of the variable "result."

Continuing the example, a statement such as "next_result=result+third," where the value of the variable "third" is "WXYZ" may result in the value of the variable "next_result" being "ABCD1234WXYZ." In such an example, an entity may have control over the left portion of the variable "result" (as described above) and may have control over the right portion of the variable "third" (i.e., the "YZ" portion). The corresponding entry in the position analysis matrix 900 ("LEFTRIGHT") is an indicator that the entity may have control over the left portion of the variable "next_result" ("ABCD1234") and of the right portion of the variable "next_result" ("YZ") but may not have control of a center portion of the variable "next_result" (in this case, the "WX" portion).

As may be contemplated, the position analysis matrix 900 illustrated in FIG. 9 is merely an illustrative example of a method for determining the amount of control an entity may have over a data item at a particular position in a data flow. The position analysis matrix 900 is one example of a position analysis representation and, as such, other position analysis representations and/or methods of determining the amount of control an entity may have over a data item at a particular position in a data flow may be considered as within the scope of the present disclosure. For example, the number of possible states on the "Left Side or the "Right Side" may be increased or decreased, the states may be determined based at least in part on additional criteria such as, for example, metadata associated with the data flow, and the entries in the position analysis matrix 900 may be grouped according to one or more criteria. Additionally, while the examples illustrated in connection with FIG. 9 were for string variables, the techniques described may be applied to other variable types including, but not limited to, numbers, functions, application programming interfaces, complex data structures, or combinations of these and/or other such variable types. Finally, while the position analysis matrix 900 illustrated in FIG. 9 is shown as a two-dimensional matrix, other representations may be used for determining the amount of control an entity may have over a data item at a particular position in a data flow including, but not limited to, look-up tables, source code representations, multi-dimensional matrices (e.g., three, four, or more dimensions), name-value pairs, database tables, functions, or other such representations.

In some embodiments, the control states and/or the result control states may be represented as a set of control metrics where, for example, full control corresponds to a high value for the control metric, no control corresponds to a low value for the control metric, and the other states correspond to values between the high value for the control metric and the low value for the control metric. In such embodiments, position data may be determined based on control metrics that exceed a data control threshold. For example, full control may correspond to a control metric of one, no control may correspond to a control metric of zero, and left control, right control, center control, and leftright control may correspond to control metrics of one-half. In such an example, the data control threshold may be set to three-quarters or some other such value to identify positions with full control. In some embodiments, the threshold may be a threshold state such as, for example, full control.

Figure 10:
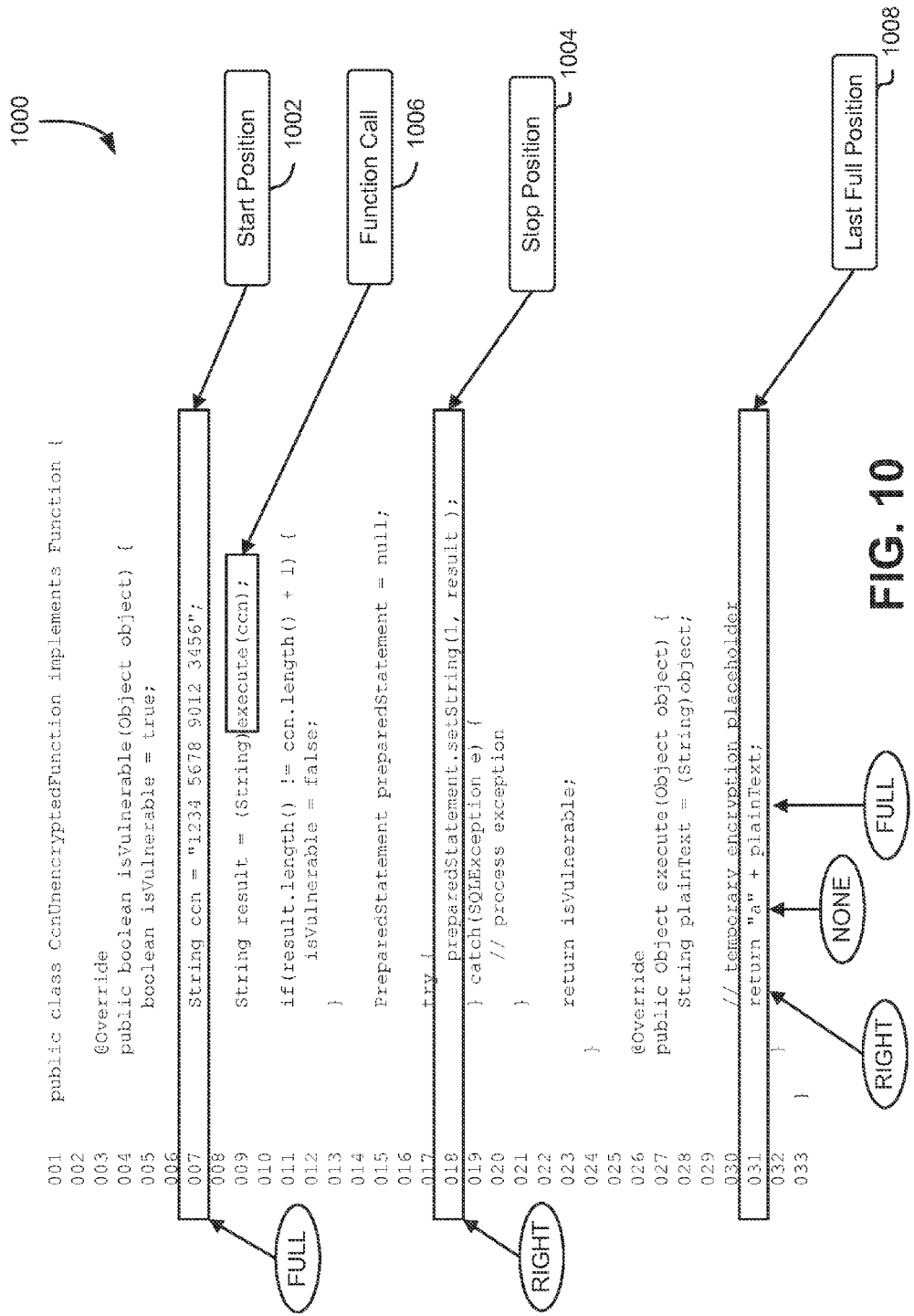
FIG. 10 illustrates an example of position analysis applied to source code in accordance with an embodiment.

FIG. 10 illustrates an example 1000 of the application of position analysis to a source code representation as described herein in accordance with an embodiment. In the example illustrated in FIG. 10, a source code representation of a class with two methods is shown. At a start position 1002 on line 007, an entity may have full control of the variable "ccn" as described herein. Between the start position 1002 and the stop position 1004, a function call 1006 is issued at line 009 that takes the variable "ccn" as an argument. Within the function (starting at line 027), a new variable "plainText" is created from the variable "ccn" and on line 031, the return with assignment changes control of the variable from "FULL" to "RIGHT" as described in connection with FIG. 9. The last full position 1008 (i.e., the last position where the entity may have full control over the data item in the data flow may be just prior to the execution of the code on line 031 of the source code representation of the class. After that execution (i.e., at the stop position 1004), the entity may have control only of the right side of the data item.

Figure 11:
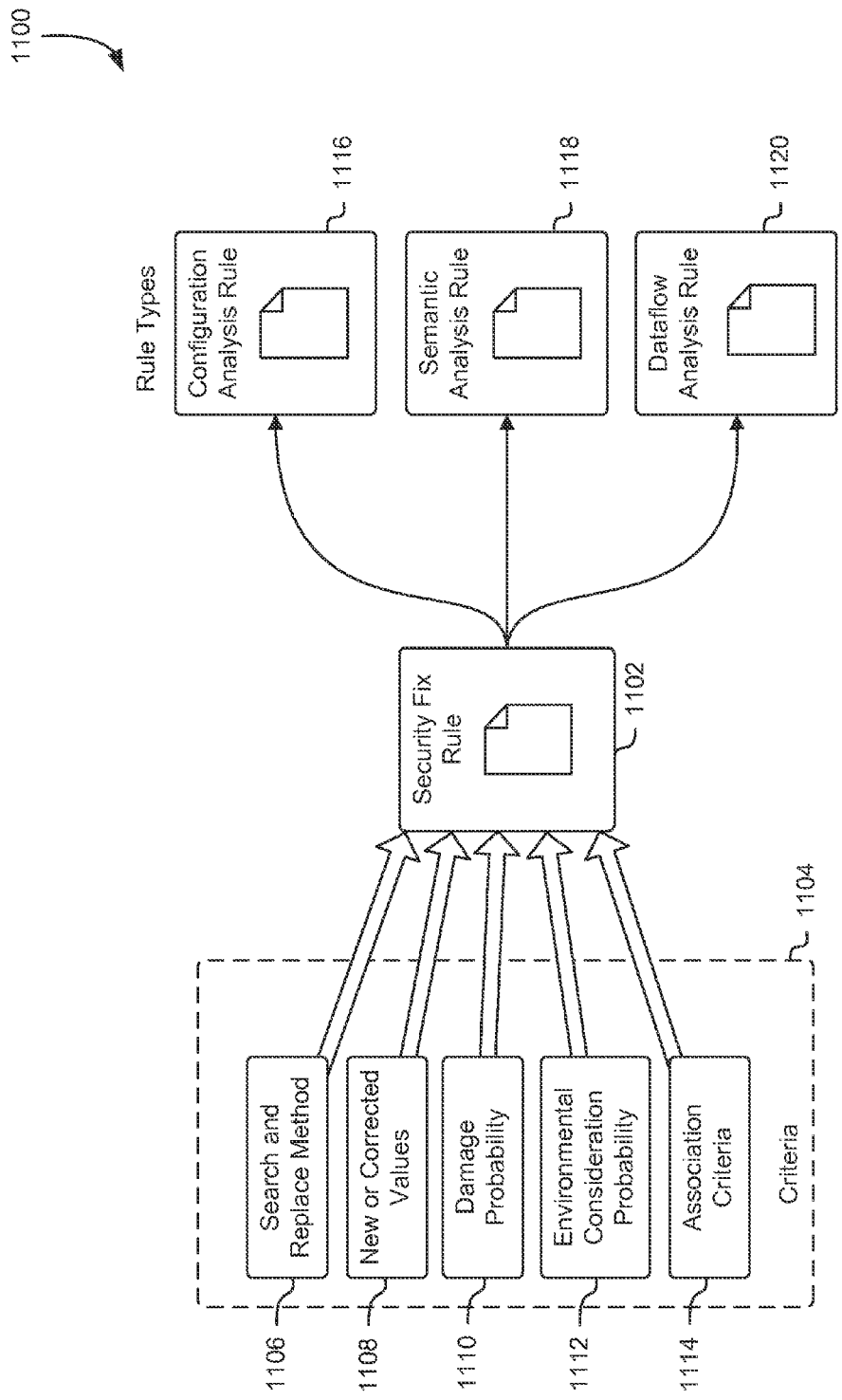
FIG. 11 illustrates an example diagram of the elements and types of a security fix rule in accordance with an embodiment.

FIG. 11 illustrates an example diagram 1100 of the elements and types of a security fix rule as described herein in connection with FIGS. 21 and 2 and in accordance with an embodiment. A security fix rule 1102, which expresses a security fix, may be based on one or more criteria 1104. Because a security fix rule 1102 is designed to associate a security fix to a type of security vulnerability, there may be unspecified values such as, for example, the location of the vulnerability in the security fix rule 1102. The criteria 1104 may be used to locate those unspecified values and to attempt to determine them and may also be used to determine the probability that applying the security fix rule 1102 may cause secondary effects.

For example, the criteria 1104 may include a means of expressing the search and replace method 1106 for a source code representation. A search and replace method may be expressed as a combination of a search method and a replace method. A search may use exact match based on, for example, line and column numbers within the source code representation. A search may also use pattern matching using, for example, regular expressions. A search may also be based on position analysis data where, for example, an attacker has the most control (i.e., the vulnerability may be highest). A search may also be based on a domain specific language that may be used to perform a search within a hierarchical structure (e.g., an XML or JSON specification) and that also may be used to generate a lookup within such hierarchical structures based at least in part on the associated hierarchy. A replace may use an exact replacement (i.e., specified by the rule), a replace before, a replace after, an insert, or some other such replacement. In some embodiments, the new or corrected values 1108 that may be used in the replacement may be specified as part of the search and replace method 1106. In some embodiments, the new or corrected values 1108 that may be used in the replacement may be specified separately from the search and replace method 1106.

Criteria 1104 may also include a damage probability 1110 (i.e., an indication of the probability that the rule may cause other parts of the source code representation to fail), environmental consideration probability 1112 (i.e., an indication of the probability that the rule may require changes to the operating environment associated with the source code representation), and/or association criteria 1114 (i.e., criteria used to associate a particular vulnerability and/or class of vulnerabilities with the remediation provided by the security fix rule 1102).

There may be a plurality of rule types of security fix rules which may be used to provide remediation to particular vulnerabilities and/or classes of vulnerabilities. A first rule type is a configuration analysis rule 1116, which may be a rule for addressing vulnerabilities in a configuration file that may be associated with a software system. It is common practice to implement software systems (e.g., servers, operating systems, or services) with configuration files that allow customization by end-users based on the operating environment. Changing some configuration values may introduce known security vulnerabilities. A configuration analysis rule 1116 may be authored to detect such vulnerabilities in configuration files and to remove them by adding configuration options, altering configuration options, or removing configuration options.

A second rule type is a semantic analysis rule 1118, which may be a rule for addressing vulnerabilities in source code related to, for example, arguments to methods, default values, or common programming errors. It is common to implement a source code library with an application programming interface (API) that expresses common function calls with one or more default arguments. Such default arguments may be left unspecified by the API user, but in some environments, may also introduce vulnerabilities. This may be particularly true in environments with nested API calls (i.e., where the invocation of a first API call uses such default arguments to select other API calls). Similarly, an argument used in an API call that may not introduce security vulnerabilities in some environments may introduce security vulnerabilities in other environments. A semantic analysis rule 1118 may be authored to detect such vulnerabilities to remove them by specifying arguments, altering arguments, or removing arguments.

A semantic analysis rule 1118 may also be authored to detect common logic errors in source code representations and to remediate them, thus improving code quality. Programming languages such as Java, C, C++, and C# have overloaded the equals sign operator to allow both assignment (i.e., to assign a value to a variable) and binary comparison (i.e., to detect whether two values are equal). For example, the statement "foo=7" assigns the value seven to the variable "foo" while the statement "foo==7" checks if the value of the variable "foo" equals seven. A statement to do a binary comparison and perform some actions based on that comparison may be expressed as "if (foo==7) do_actions(foo)" but the statement "if (foo=7) do_actions(foo)" (with a single equals sign) is also a valid statement in such languages. Because this second statement, while legal, is probably incorrect, a semantic analysis rule 1118 may be specified to remediate such a statement. However, because the source code may be reliant on such an error, such a security fix rule may have a high damage probability 1110.

A dataflow analysis rule 1120 may be altered to traverse a dataflow within a source code representation and determine the most appropriate point within that dataflow to, for example, apply encryption, process output, or preprocess calls to external systems or services. An example of where such a rule may be used is when a user is entering secure information such as a credit card on a web page. Before such secure information is transferred to the web service, it may be encrypted and may normally be encrypted using a secure connection. However, when the secure information is received at the web service, it may normally be decrypted for processing. Such processing may include storing the information for further use in, for example, a database. A dataflow analysis rule 1120 may be authored to traverse the dataflow and detect where, in the dataflow, the information is stored, and to ensure that it is encrypted before storage. As may be contemplated, the types and examples of security fix rules described herein are illustrative examples and other such types and examples of security fix rules may be considered as within the scope of the present disclosure.

Figure 12:
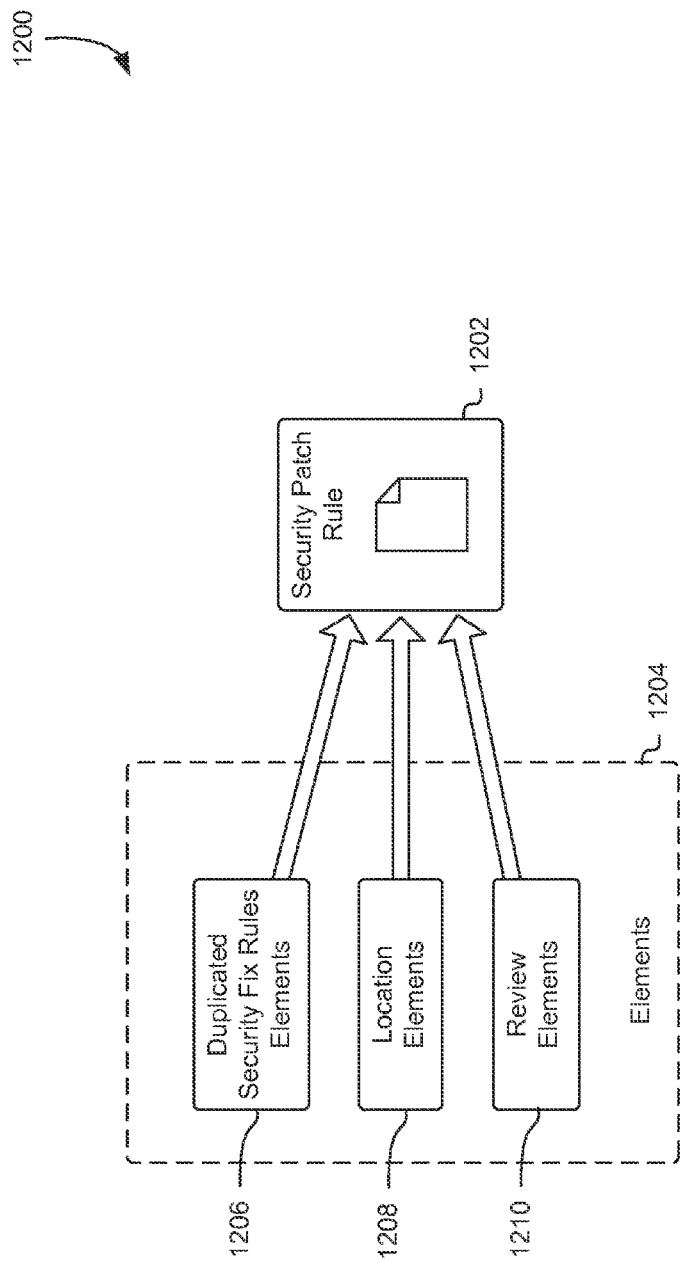
FIG. 12 illustrates an example diagram of the elements of a security patch rule in accordance with an embodiment.

FIG. 12 illustrates an example diagram 1200 of the elements of a security patch rule as described herein in connection with FIGS. 21 and 2 and in accordance with an embodiment. A security patch rule 1202 may be based on a security fix rule as described herein in connection with FIG. 11. A security patch rule may express one or more security fixes for vulnerabilities identified by scanning a source code representation, and is designed to explicitly map a security fix rule to a specific security vulnerability by, for example, determining locations within the source code representation to apply the security patch. A security patch rule 1202 may include one or more elements 1204 such as elements duplicated from the associated security fix rule 1206, location elements 1208, and review elements 1210. The location elements 1208 may be determined based on position analysis data, line and column numbers, or other such data and/or metadata. The review elements 1210 may include additional parameters that may be filled in by a process or user as well as the status of the security patch rule (i.e., whether it is ready for review, whether it has been reviewed and is ready to be finalized with additional parameters, or whether it has been finalized and is ready to be applied).

FIGS. 13A, 13B, and 13C illustrate an example security fix rule as described herein in connection with FIG. 11 and in accordance with an embodiment. FIG. 13A shows the first part 1300 of the specification for the security fix rule illustrated in FIGS. 13A, 13B, and 13C. FIG. 13B shows the second part 1302 of the specification for the security fix rule illustrated in FIGS. 13A, 13B, and 13C. FIG. 13C shows the first part 1304 of the specification for the security fix rule illustrated in FIGS. 13A, 13B, and 13C. The security fix rule illustrated in FIGS. 13A, 13B, and 13C specifies one or more methods of identifying the optimal point within a dataflow to wrap a reference to the credit card number with an encryption method. This security fix rule makes use of a security API (lines 048 to 051 and lines 079 to 083). Because key management facilities may be site dependent, this rule requires the developer to provide basic key management facilities (lines 055 to 058 and lines 086 to 089). This security fix rule is extremely intrusive and can have significant environmental considerations (line 002). This security fix rule does not have positional information (i.e., the location for to apply the patch), but such positional information may be determined using position analysis as indicated in lines 037 and 069.

FIGS. 14A, 14B, 14C, and 14D illustrate an example security patch rule in review phase as described herein in connection with FIG. 11 and in accordance with an embodiment. FIG. 14A shows the first part 1400 of the specification for the security patch rule in review phase illustrated in FIGS. 14A, 14B, 14C, and 14D. FIG. 14B shows the second part 1402 of the specification for the security patch rule in review phase illustrated in FIGS. 14A, 14B, 14C, and 14D. FIG. 14C shows the third part 1404 of the specification for the security patch rule in review phase illustrated in FIGS. 14A, 14B, 14C, and 14D. FIG. 14D shows the fourth part 1406 of the specification for the security patch rule in review phase illustrated in FIGS. 14A, 14B, 14C, and 14D. A security patch rule in review phase is a security patch rule that is ready for review by, for example, a security subject matter expert, an end user, or a process. The security patch rule illustrated in FIGS. 14A, 14B, 14C, and 14D corresponds to the security fix rule illustrated in FIGS. 13A, 13B, and 13C and has had data such as location data computed based on position analysis (lines 048 to 059 and lines 080 to 091). The security patch rule illustrated in FIGS. 14A, 14B, 14C, and 14D may have had these locations determined by performing one or more of the position analysis techniques described herein. The security patch rule illustrated in FIGS. 14A, 14B, 14C, and 14D presents two different options for wrapping a card number with an encryption method before storing it (lines 60 to 65 and lines 92 to 98). As with the security fix rule illustrated in FIGS. 13A, 13B, and 13C, this security patch rule makes use of a security API. This security patch rule also requires the user to provide basic key management facilities (lines 066 to 069 and lines 099 to 104). As this rule is in the review phase, there are multiple solutions proposed (lines 046 and 078) and one or more properties are not yet defined (lines 066 to 069 and lines 099 to 104).

FIGS. 15A, 15B, and 15C illustrate an example security patch rule in apply phase as described herein in connection with FIG. 2 and in accordance with an embodiment. FIG. 15A shows the first part 1500 of the specification for the security patch rule in apply phase illustrated in FIGS. 15A, 15B, and 15C. FIG. 15B shows the second part 1502 of the specification for the security patch rule in apply phase illustrated in FIGS. 15A, 15B, and 15C. FIG. 15C shows the third part 1504 of the specification for the security patch rule in apply phase illustrated in FIGS. 15A, 15B, and 15C. A security patch rule in apply phase is a security patch rule that has been reviewed and is ready to be applied. The security patch rule illustrated in FIGS. 15A, 15B, and 15C corresponds to the security patch rule in review phase illustrated in FIGS. 14A, 14B, 14C, and 14D. The security patch rule illustrated in FIGS. 15A, 15B, and 15C identifies the optimal point within a data flow trace to wrap the reference to the credit card number with an encryption method (lines 048 to 059) and, as with the security patch rule illustrated in FIGS. 14A, 14B, 14C, and 14D, this security patch rule makes use of a security API and requires the developer to provide basic key management facilities (lines 066 to 071). As this rule is in the apply phase, a single solution is proposed and the one or more properties have been defined.

FIG. 16 illustrates an example of the results 1600 of applying a security patch rule to source code as described herein in connection with FIG. 11 and in accordance with an embodiment. In the example illustrated in FIG. 16, the security patch rule in apply phase illustrated in FIGS. 15A, 15B, and 15C has been applied at the last full position 1008 (as described in connection with FIG. 10). As illustrated in FIG. 16, line 031 from the example source code representation illustrated in FIG. 10 has been commented out (see line 031 in FIG. 16) and replaced with the remediation 1602 at lines 032 to 036.

Figure 17:
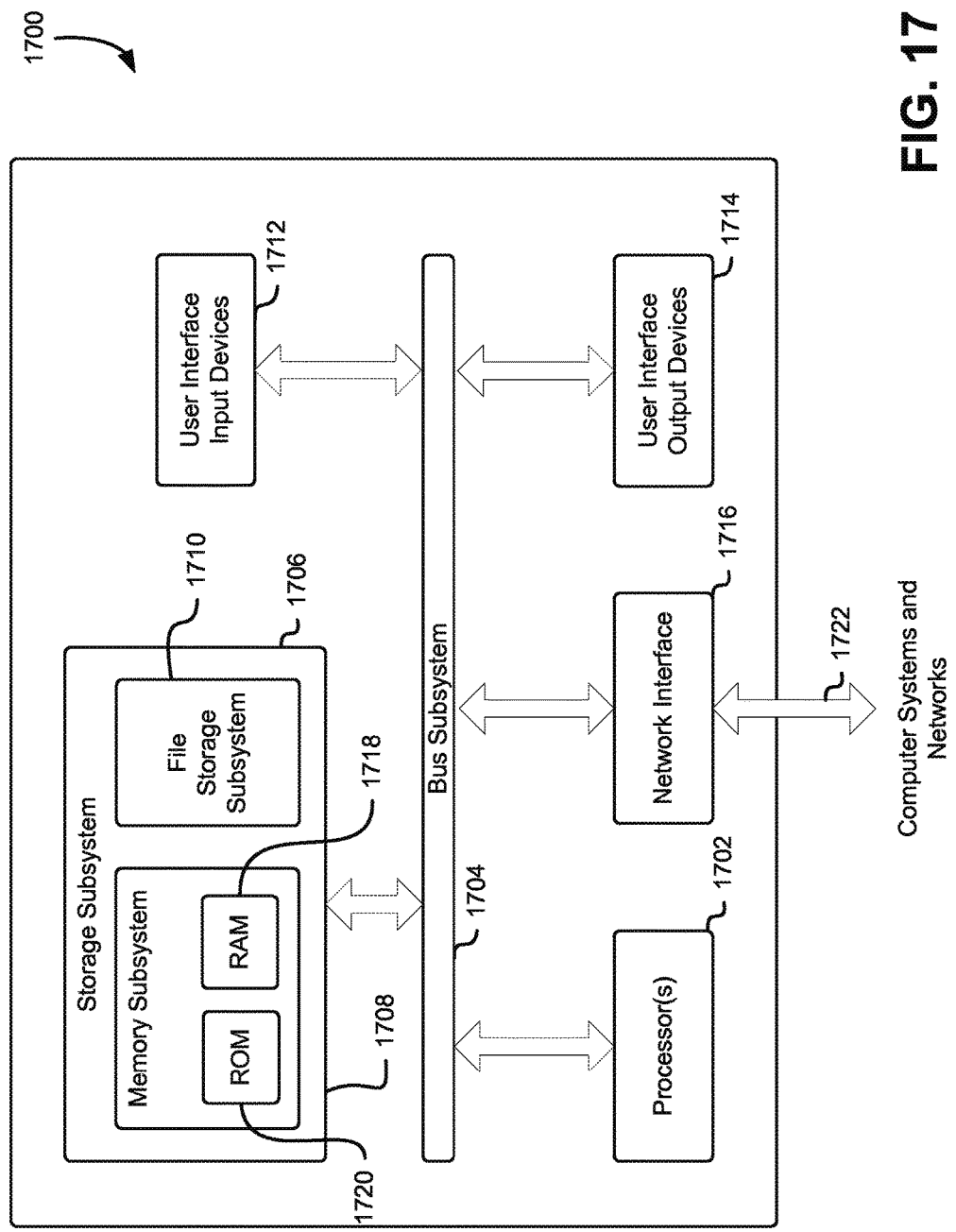
FIG. 17 illustrates an environment in which various embodiments can be implemented.

FIG. 17 is a simplified block diagram of a computer system 1700 that may be used to practice an embodiment of the present invention. In various embodiments, one or more instances of the computer system 1700 may be used to implement any of the systems illustrated and described above. For example, one or more instances of the computer system 1700 may be used to implement processes for position analysis according to the present disclosure. As shown in FIG. 17, the computer system 1700 may include one or more processors 1702 that may be configured to communicate with and are operatively coupled to a number of peripheral subsystems via a bus subsystem 1704. These peripheral subsystems may include a storage subsystem 1706, comprising a memory subsystem 1708 and a file storage subsystem 1710, one or more user interface input devices 1712, user interface output devices 1714, and a network interface subsystem 1716.

The bus subsystem 1704 may provide a mechanism for enabling the various components and subsystems of computer system 1700 to communicate with each other as intended. Although the bus subsystem 1704 is shown schematically as a single bus, alternative embodiments of the bus subsystem may utilize multiple busses.

The network interface subsystem 1716 may provide an interface 1722 to other computer systems and networks. The network interface subsystem 1716 may serve as an interface for receiving data from and transmitting data to other systems from the computer system 1700. For example, the network interface subsystem 1716 may enable a user computer system device to connect to the computer system 1700 via the Internet and/or other network, such as a mobile network, and facilitate communications using the network(s) to analyze source code representations for position information.

The user interface input devices 1712 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. Further, in some embodiments, input devices may include devices usable to obtain information from other devices within a computer system. Input devices may include, for instance, magnetic or other card readers, one or more USB interfaces, near field communications (NFC) devices/interfaces and other devices/interfaces usable to obtain data (e.g., source code representations) from other devices. In general, use of the term "input device" is intended to include all possible types of devices and mechanisms for inputting information to the computer system 1700.

The user interface output devices 1714 may include a display subsystem, a printer, non-visual displays (e.g., audio and/or tactile output devices), or other such display devices. Generally, the output devices 1714 may invoke one or more of any of the five senses of a user. For example, the display subsystem may be a cathode ray tube (CRT), a flat-panel device, such as a liquid crystal display (LCD), light emitting diode (LED) display, or a projection or other display device. In general, use of the term "output device" is intended to include all possible types of devices and mechanisms for outputting information from the computer system 1700. The user interface output devices 1714 may be used, for example, to generate and/or present user interfaces to facilitate user interaction with applications performing processes described herein and variations therein, when such interaction may be appropriate. While a computer system 1700 with user interface output devices is used for the purpose of illustration, it should be noted that the computer system 1700 may operate without an output device, such as when the computer system 1700 is operated in a server rack and, during typical operation, an output device is not needed.

The storage subsystem 1706 may provide a computer-readable storage medium for storing the programming and data constructs that provide the functionality of the present invention. Software (programs, code modules, instructions) that, when executed by one or more processors 1702 may provide the functionality of the present invention, may be stored in storage subsystem 1706. The storage subsystem 1706 may also provide a repository for storing data used in accordance with the present invention. The storage subsystem 1706 may comprise memory subsystem 1708 and disk or file storage subsystem 1710. The storage subsystem may include database storage for position analysis information, file storage, and/or other storage functionality.

The memory subsystem 1708 may include a number of memory devices including, for example, random access memory (RAM) 1718 for storage of instructions and data during program execution and read-only memory (ROM) 1720 in which fixed instructions may be stored. The file storage subsystem 1710 may provide a non-transitory persistent (non-volatile) storage for program and data files, and may include a hard disk drive, a floppy disk drive along with associated removable media, a compact disk read-only memory (CD-ROM) drive, a digital versatile disk (DVD), an optical drive, removable media cartridges, and other like storage media.

The computer system 1700 may be of various types including a personal computer, a portable computer, a workstation, a network computer, a mainframe, a kiosk, a server, or any other data processing system. Due to the ever-changing nature of computers and networks, the description of computer system 1700 depicted in FIG. 17 is intended only as a specific example for purposes of illustrating the preferred embodiment of the computer system. Many other configurations having more or fewer components than the system depicted in FIG. 17 are possible.

The various embodiments further can be implemented in a wide variety of operating environments, which in some cases can include one or more user computers, computing devices or processing devices that can be used to operate any of a number of applications. User or client devices may include any of a number of general purpose personal computers, such as desktop, laptop or tablet computers running a standard operating system, as well as cellular, wireless and handheld devices running mobile software and capable of supporting a number of networking and messaging protocols. Such a system may also include a number of workstations running any of a variety of commercially-available operating systems and other known applications for purposes such as development and database management. These devices may also include other electronic devices, such as dummy terminals, thin-clients, gaming systems and other devices capable of communicating via a network. These devices may also include virtual devices such as virtual machines, hypervisors and other virtual devices capable of communicating via a network.

The various embodiments of the present disclosure may utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, or any combination thereof.

In embodiments utilizing a web server, the web server may run any of a variety of server or mid-tier applications, including Hypertext Transfer Protocol ("HTTP") servers, Hypertext Transfer Protocol Secure ("HTTPS") servers, Transport Layer Security ("TLS") servers, File Transfer Protocol ("FTP") servers, Common Gateway Interface ("CGI") servers, data servers, Java servers, Apache servers, Internet Information Services ("IIS") servers, proxy servers (e.g., F5®, Squid, etc.), business application servers, and/or other such servers. The server(s) may also be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python®, JavaScript®, or TCL, as well as combinations thereof. The server(s) may also include database servers, including without limitation those commercially available from Oracle®, Microsoft®, Sybase®, and IBM® as well as open-source servers such as MySQL, Postgres, SQLite, NoSQL, Hadoop, MongoDB, or other servers capable of storing, retrieving, and accessing structured or unstructured data. Database servers may include table-based servers, document-based servers, unstructured servers, relational servers, non-relational servers, or combinations of these and/or other database servers.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such storage devices may also include a computer-readable storage media reader, a communications device (e.g., a modem, a network card (wireless or wired), or an infrared communication device), and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium that can be used to store the desired information and that can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory (referred to herein as a "non-transitory computer-readable storage medium"), may be tangible (referred to herein as a "tangible computer-readable storage medium"), or may be both tangible and non-transitory (referred to herein as a "tangible non-transitory computer-readable storage medium").

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method:
generating, at a sever, an abstract syntax tree representation of a representation of an application source code, the abstract syntax tree representation including a set of nodes and a set of edges, each node of the set of nodes corresponding to a respective instruction within the representation of the application source code, each edge of the set of edges connecting a pair of nodes, each edge of the set of edges representing a relationship between the pair of nodes;
determining a set of start nodes within the abstract syntax tree representation, each start node of the set of start nodes corresponding to a respective start location within the representation of the application source code;

determining, for each start node of the set of start nodes, a corresponding set of stop nodes within the abstract syntax tree representation, each stop node of the set of stop nodes corresponding to a respective stop location within the representation of the application source code;

identifying a set of data impact nodes within the abstract syntax tree representation that impact a control metric of a set of data at one or more data positions within the representation of the application source code, the set of data impact nodes identified based at least in part on the respective instruction associated with each data impact node in the set of data impact nodes, wherein the control metric corresponds to an amount of control a malicious attacker has at the one or more data positions;

performing a data flow analysis of the representation of the application source code, the data flow analysis starting from a selected start node of the set of start nodes, the data flow analysis stopping at a selected stop node of the set of stop nodes corresponding to the selected start node;

determining, as part of the data flow analysis and based at least in part on the set of data impact nodes, a selected data position of the one or more data positions where the control metric of the set of data corresponding to the data position is at least equal to a data control threshold; and providing the selected data position.

2. The computer-implemented method of claim 1, wherein the selected data position is selected based at least in part on a proximity measure between the selected data position and the selected stop node.

3. The computer-implemented method of claim 1, wherein the selected data position is selected based at least in part on the control metric of the set of data corresponding to the selected data position being greater than a respective control metric of the set of data corresponding to one or more of the one or more data positions.

4. The computer-implemented method of claim 1, wherein the selected data position is selected based at least in part on the control metric of the set of data corresponding to the selected data position being lesser than a respective control metric of the set of data corresponding to one or more of the one or more data positions.

5. The computer-implemented method of claim 1, wherein the control metric is determined based at least in part on a position analysis matrix, the position analysis matrix specifying a set of result control states, each result control state of the set of result control states selected from a set of control states, each result control state of the set of result control states selected based at least in part on a respective pair of control states from the set of control states, the set of control states including at least one of: full, left, right, center, leftright, or none.

6. A system, comprising:
at least one computing device comprising at least one processor and at least one non-transitory memory storing instructions which when executed by the processor cause the at least one computing device to:
generate a representation of an application source code;
determine a set of start locations within the representation of the application source code, each start location of the set of start locations corresponding to respective start location within the representation of the application source code;

determine, for each start location of the set of start locations, a corresponding set of stop locations within the representation of the application source code, each stop location of the set of stop locations corresponding to a respective start location within the representation of the application source code;

identify a set of data impact locations within the representation of the application source code that impact a control of a set of data at one or more data positions within the representation of the application source code, the set of data impact locations identified based at least in part on a respective instruction associated with each data impact location in the set of data impact locations; and provide a set of selected data positions by performing a data flow analysis of the representation of the application source code, the data flow analysis starting from a selected start location of the set of start locations, the data flow analysis stopping at a selected stop location of the set of stop locations corresponding to the selected start location, the data flow analysis configured to select, based at least in part on the set of data impact locations, each selected data position of the set of selected data positions from the one or more data positions based at least in part on a location where a control metric of the set of data corresponding to the data position exceeds a data control threshold, wherein the control metric corresponds to an amount of control a malicious attacker has at the data position.

7. The system of claim 6, wherein:
the representation is an abstract syntax tree representation of the application source code, the abstract syntax tree representation of the representation of the application source code including a set of nodes and a set of edges, each node of the set of nodes corresponding to a respective instruction within the representation of the application source code, each edge of the set of edges connecting a pair of nodes, each edge of the set of edges representing a relationship between the pair of nodes;
each start location of the set of start locations corresponds to a respective first subset of the set of nodes;
each stop location of the set of stop locations corresponds to a respective second subset of the set of nodes; and
each data impact location of the set of data impact locations corresponds to a respective third subset of the set of nodes.

8. The system of claim 6, comprising further instructions which when executed by the at least one processor cause the computing device to provide the set of data positions to an analysis service of the one or more services configured to perform static application security testing, the analysis service configured to determine one or more vulnerabilities in the application source code based at least in part on one or more data positions in the set of data positions.

9. The system of claim 6, wherein each selected data position in the set of selected data positions is selected based at least in part on a proximity measure between the selected data position and a selected stop node corresponding to the selected start location.

10. The system of claim 6, wherein each selected data position of the set of selected data positions is selected based at least in part on the control metric of the set of data corresponding to the selected data position being at least equal to a respective control metric of the set of data corresponding to one or more of the one or more data positions.

11. The system of claim 6, wherein the control metric is determined based at least in part on a position analysis representation, the position analysis representation at least specifying a first set of control states and a second set of results corresponding to respective pairs of control states of the first set of control states.

12. The system of claim 11, wherein the position analysis representation is a position analysis matrix.

13. The system of claim 11, wherein the first set of control states includes at least one of: full, left, right, center, leftright, or none.

14. A tangible non-transitory computer-readable storage medium having code stored thereon that, when executed by a computer, causes the computer to perform operations including:
   determine a set of start locations within a representation of an application source code;
   determine, for each start location of the set of start locations, a corresponding set of stop locations within the representation of the application source code;
   identify a set of data impact locations within the representation of the application source code that impact a control of a set of data at one or more data positions within the representation of the application source code, the set of data impact locations identified based at least in part on a respective instruction associated with each data impact location in the set of data impact locations;
   perform a data flow analysis of the representation of the application source code, the data flow analysis starting from a selected start location of the set of start locations, the data flow analysis stopping at a selected stop location of the set of stop locations corresponding to the selected start location, the data flow analysis configured to determine, based at least in part on the set of data impact locations, a selected data position of the one or more data positions where a control metric of the set of data corresponding to the data position exceeds a data control threshold, wherein the control metric corresponds to an amount of control a malicious attacker has at the one or more data positions; and
   provide the selected data position.

15. The tangible non-transitory computer-readable storage medium of claim 14, wherein the representation is an abstract representation.

16. The tangible non-transitory computer-readable storage medium of claim 14, wherein the representation is an abstract syntax tree representation, the abstract syntax tree representation including a set of nodes and a set of edges, each node of the set of nodes corresponding to a respective instruction within the representation of the application source code, each edge of the set of edges connecting a pair of nodes, each edge of the set of edges representing a relationship between the pair of nodes;
   each start location of the set of start locations corresponds to a respective first subset of the set of nodes;
   each stop location of the set of stop locations corresponds to a respective second subset of the set of nodes; and
   each data impact location of the set of data impact locations corresponds to a respective third subset of the set of nodes.

17. The tangible non-transitory computer-readable storage medium of claim 14, wherein the code further includes code that, when executed by a computer, causes the computer to perform operations to provide the selected data position to an analysis service configured to perform static application security testing, the analysis service configured to determine one or more vulnerabilities in the application source code based at least in part on one or more of the one or more data positions.

18. The tangible non-transitory computer-readable storage medium of claim 14, wherein the selected data position is selected based at least in part on the control metric of the set of data corresponding to the selected data position being at least equal to a respective control metric of the set of data corresponding to one or more of the one or more data positions.

19. The tangible non-transitory computer-readable storage medium of claim 14, wherein the control metric is determined based at least in part on a position analysis representation, the position analysis representation at least specifying a first set of control states and a second set of results corresponding to respective pairs of control states of the first set of control states.

20. The tangible non-transitory computer-readable storage medium of claim 19, wherein the position analysis representation is a position analysis matrix.

* * * * *